US012682613B2

(12) United States Patent (10) Patent No.: US 12,682,613 B2
Goel et al. (45) Date of Patent: Jul. 14, 2026

(54) GRAPH BASED METADATA STRUCTURING ALGORITHM TO ENABLE MACHINE LEARNING

(71) Applicant: Tempus AI, Inc., Chicago, IL (US)

(72) Inventors: Akshay Goel, New York, NY (US); Jagadish Venkataraman, Menlo Park, CA (US); Jacob William Hunter Gordon, West Orange, NJ (US)

(73) Assignee: Tempus AI, Inc., Chicago, IL (US)

( * ) Notice: Subject to any disclaimer, the term of this patent is extended or adjusted under 35 U.S.C. 154(b) by 270 days.

(21) Appl. No.: 18/363,182

(22) Filed: Aug. 1, 2023

(65) Prior Publication Data

US 2025/0046065 A1     Feb. 6, 2025

(51) Int. Cl.
  *G06V 10/774*        (2022.01)
  *G06T 7/00*          (2017.01)
  *G06V 10/74*         (2022.01)
(52) U.S. Cl.
  CPC .......... *G06V 10/774* (2022.01); *G06T 7/0012* (2013.01); *G06V 10/761* (2022.01); *G06T 2207/20081* (2013.01); *G06V 2201/03* (2022.01)
(58) Field of Classification Search
  None
  See application file for complete search history.

(56) References Cited

U.S. PATENT DOCUMENTS

2012/0168492 A1*  7/2012  Herbst ................... G16H 30/20
                                                          235/375
2020/0211716 A1   7/2020  Lefkofsky
2021/0097021 A1*  4/2021  Kadlabalu ............... G06N 5/04

OTHER PUBLICATIONS

Boser, E. Bernhard, et al. "A Training Algorithm for Optimal Margin Classifiers", (1992), 5th Annual ACM Workshop on Computational Learning Theory, ACM Press, pp. 144-152.
Breiman, Leo "Random Forests—Random Features", Technical Report 567, Statistics Department, U.C. Berkeley, Sep. 1999, pp. 1-29.
Brill, Eric, et al. "An Improved Error Model for Noisy Channel Spelling Correction", (2000), 38th Annual Meeting on Association for Computational Linguistics (ACL '00), Association for Computational Linguistics, USA, pp. 286-293.

(Continued)

*Primary Examiner* — Lennin R Rodriguezgonzalez
(74) *Attorney, Agent, or Firm* — MORGAN, LEWIS & BOCKIUS LLP

(57) ABSTRACT

In the disclosed systems and methods for categorizing medical data, a computer system obtains, in electronic form, a plurality of medical records. Each medical record includes corresponding medical data from a respective medical evaluation and corresponding metadata comprising a plurality of attributes about the respective medical evaluation. Each respective attribute comprises a corresponding string of text. The computer system determines, for each respective pair of medical records consisting of a first medical record and a second medical record, a corresponding pairwise similarity between, for each respective attribute in a set of attributes, the corresponding string of text for the first medical record and the corresponding string of text for the second medical record. The computer system identifies a first subset of the plurality of medical records. Each respective medical record in the first subset is connected to each other through pairwise similarities that each satisfies a similarity threshold.

18 Claims, 30 Drawing Sheets

(56) References Cited

OTHER PUBLICATIONS

Hasan, Syeda Shabnam, et al. "Approximate String Matching Algorithms: A Brief Survey and Comparison", International Journal of Computer Applications (0975-8887), vol. 120—No. 8, Jun. 2015, pp. 26-31.

Hopcroft, John, et al. "Algorithm 447: Efficient Algorithms for Graph Manipulation[H]" Communications of the ACM, 16(6), (1973), pp. 372-378.

Hussain, Shah, et al. "Modern Diagnostic Imaging Technique Applications and Risk Factors in the Medical Field: A Review", BioMed Research International vol. 2022, Article ID 5164970, pp. 1-19.

McLachlan, G. J., et al. "A mixture model-based approach to the clustering of microarray expression data", BioInformatics, vol. 18, No. 3, 2002, pp. 413-422.

Murphy, Allan H. "The Finley Affair: A Signal Event in the History of Forecast Verification", Weather and Forecasting, vol. 11, No. 1, Mar. 1996, pp. 3-18.

Ng, Andrew Y., et al. "On Discriminative vs. Generative classifiers: A comparison of logistic regression and naive Bayes", Advances in Neural Information Processing Systems, 2002, pp. 1-8.

Winkler, William E., "String Comparator Metrics and Enhanced Decision Rules in the Fellegi-Sunter Model of Record Linkage", Proceedings of the Section on Survey Research Methods (1990), pp. 1-9.

Schliep, Alexander, et al. "Using hidden Markov models to analyze gene expression time course data", BioInformatics, vol. 19, Suppl. 1, 2003, pp. i255-i263.

Harvey; Hugh, et al. "A Standardised Approach for Preparing Imaging Data for Machine Learning Tasks in Radiology," Springer Nature Switzerland AG, Jan. 2019, Artificial Intelligence in Medical Imaging, pp. 61-72.

* cited by examiner

100

92

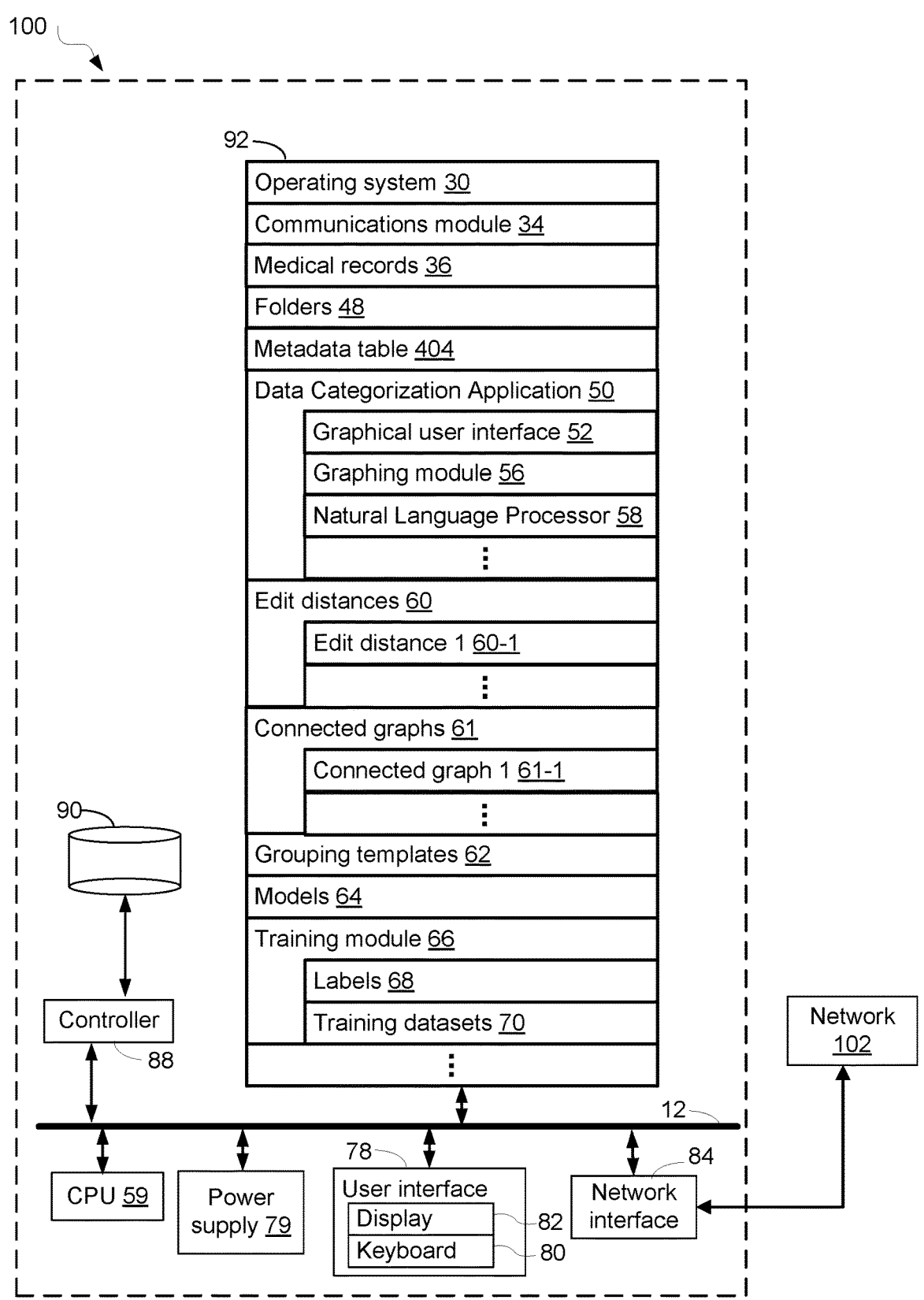

Operating system 30

Communications module 34

Medical records 36

Folders 48

Metadata table 404

Data Categorization Application 50

Graphical user interface 52

Graphing module 56

Natural Language Processor 58

⋮

Edit distances 60

Edit distance 1 60-1

⋮

Connected graphs 61

Connected graph 1 61-1

⋮

Grouping templates 62

Models 64

Training module 66

Labels 68

Training datasets 70

⋮

90

Controller

88

12

CPU 59

Power supply 79

User interface 78

Display 82

Keyboard 80

Network interface 84

Network 102

Medical records 36

Medical record 1 36-1

Medical evaluation 1 38-1-1

Medical data 40-1-1

Metadata 42-1

Metadata attribute A 44-1-A

Metadata attribute A value 46-1-A

Metadata attribute B 44-1-B

Metadata attribute B value 46-1-B

⋮

Medical record 1 36-1

Medical evaluation 2 38-1-2

Medical data 40-1-2

Metadata 42-2

Metadata attribute A 44-2-A

Metadata attribute A value 46-2-A

Metadata attribute B 44-2-B

Metadata attribute B value 46-2-B

⋮

⋮

Medical record 3 36-3

Method 200

202 Obtain, in electronic form, a plurality of medical records, where each respective medical record in the plurality of medical records includes (i) corresponding medical data from a respective medical evaluation in a plurality of medical evaluations, and (ii) corresponding metadata including, for each respective attribute in a corresponding plurality of attributes about the respective medical evaluation, a corresponding string of text.

203 The plurality of medical records comprises 100 or more medical records.

208 The plurality of medical records comprises a plurality of medical image files.

210 Compare metadata between respective medical records to determine, for each respective pair of medical records in the plurality of medical records, a corresponding pairwise similarity between, for each respective attribute in a set of one or more respective attributes, (i) the corresponding string of text for a first medical record in the respective pair of medical records and (ii) the corresponding string of text for a second medical record in the respective pair of medical records.

204 The set of one or more respective attributes comprises an annotated description of a type of medical evaluation.

206 The set of one or more respective attributes comprises an attribute selected from the group consisting of an exam description, an imaging modality, an image slice thickness, an image acquisition time, use of a contrast agent, a distance between a source and a patient, and a description of the medical evaluation.

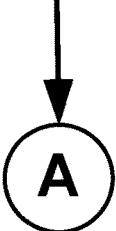

FIG. 2A

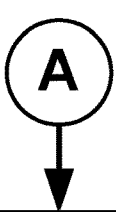

210 (cont'd)

216 The pairwise similarity is an edit distance.

218 The edit distance is selected from the group consisting of a Levenshtein distance, a Jaro-Winkler distance, a Damerau-Levenshtein distance, a Jaccard distance, and a scaled or weighted version thereof.

220 The edit distance comprises a scaled Levenshtein distance.

222 The set of one or more respective attributes consists of a single respective attribute.

224 The set of one or more respective attributes is at least two respective attributes and the pairwise similarity consists of a single similarity value.

226 The determining B) comprises comparing (i) a first concatenated string of text including, for each respective attribute in the at least two respective attributes, the corresponding string of text for the first medical record in the respective pair of medical records and (ii) a second concatenated string of text including, for each respective attribute in the at least two respective attributes, the corresponding string of text for the second medical record in the respective pair of medical records.

228 The determining B) comprises generating, for each respective attribute in the at least two respective attributes, a corresponding component similarity, thereby obtaining a plurality of component similarities for the respective pair of medical records; and combining the plurality of component similarities to obtain a single similarity value for the respective pair of medical records.

FIG. 2B

B 210 (cont'd)

2104 For each respective medical record in the plurality of medical records: for a respective attribute in the set of one or more respective attributes, evaluate the corresponding string of text for the presence of a corresponding first substring of text representing a first type of information. When present in the corresponding string of text, exclude the corresponding first substring of text when determining a pairwise similarity during the determining.

2106 The evaluating is natural language processing of the corresponding string of text.

2108 The natural language processing comprises searching for one or more regular expressions in the corresponding string of text.

2110 The first type of information is an orientation for a medical image.

2112 The first type of information is an MRI modality.

2114 The first type of information is an imaging contrast phase.

230 Categorize respective medical records based on the plurality of pairwise similarities, thereby identifying a plurality of subsets of medical records in the plurality of medical records comprising a first subset of medical records and a second subset of medical records, wherein for each respective subset of medical records, each medical record in the respective subset is directly or indirectly connected to each other medical record in the respective subset through a subset of the plurality of pairwise similarities that each satisfy a first similarity threshold.

231 Identify a first subset in the plurality of subsets of medical records, wherein each respective medical record in the first subset is directly or indirectly connected to each other respective medical record in the first subset through a set of pairwise similarities that each satisfy a first similarity threshold.

Identify a second subset in the plurality of subsets of medical records wherein, (a) the second subset does not include any of the respective medical records in the first subset of the plurality of medical records and (b) each respective medical record in the second subset is directly or indirectly connected to each other respective medical record in the second subset through a respective set of pairwise similarities that each satisfy the first similarity threshold.

244 Iteratively identify additional subsets of the plurality of medical records where, (a) each additional subset does not include any of the respective medical records in any previously identified subset of the plurality of medical records and (b) each respective medical record in each respective additional subset is directly or indirectly connected to each other respective medical record in the respective additional subset through a respective set of pairwise similarities that each satisfy the first similarity threshold.

238 The first similarity threshold consists of a single similarity threshold value.

240 The set of one or more respective attributes is at least two respective attributes and the first similarity threshold comprises a corresponding similarity threshold value for each respective attribute in the at least two respective attributes.

FIG. 2D

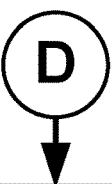

230 *Continued . . .*

212 Generate a first similarity graph that includes a plurality of nodes and a plurality of edges, where each respective node in the plurality of nodes corresponds to a respective medical record in the plurality of medical records, and each respective edge in the plurality of edges (i) connects a respective pair of nodes in the plurality of nodes and (ii) has a respective length based on the corresponding pairwise similarity for the respective pair of medical records corresponding to the pair of nodes.

214 The first similarity graph is generated by: creating a respective node, in the plurality of nodes, for each respective medical record in the plurality of medical records; and creating an edge, in the plurality of edges, between two respective nodes when the corresponding similarity between the pair of medical records corresponding to two respective nodes satisfies the first similarity threshold.

232 The identifying comprises identifying a first component of the first similarity graph.

234 The first component of the first similarity graph is identified by: a) identifying a first edge, in the plurality of edges, connecting a first pair of nodes, in the plurality of nodes, that represents a greatest similarity between any pair of medical records in the plurality of medical records and adding the first pair of nodes to the first component; b) identifying each respective edge, in the plurality of edges, that (i) is directly connected to one of the first pair of nodes and (ii) has a corresponding length satisfying the first similarity threshold, thereby identifying a first subset of edges, and adding each respective node connected to respective edge in the first subset of edges to the first component; and c) repeating the identifying b) for each respective node added to the first component.

236 Identify a second subset of the plurality of medical records by identifying a second component of the first similarity graph.

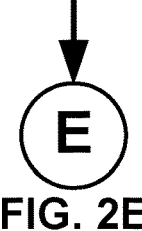

FIG. 2E

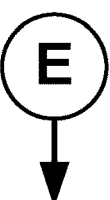

241 Associate each respective subset of medical records in the plurality of subsets of medical records with a respective categorical label for the corresponding subset of medical records.

243 Obtain, in electronic form, one or more additional medical records that were not in the plurality of medical records, wherein each respective additional medical record in the one or more additional medical records includes (i) corresponding medical data from a respective medical evaluation in one or more additional medical evaluations that were not in the plurality of medical evaluations, and (ii) corresponding metadata comprising, for each respective attribute in a plurality of attributes about the respective additional medical evaluation, a corresponding string of text.

Assign, for each respective additional medical record in the one or more additional medical records, the respective additional medical record to either (i) a respective subset of medical records in the plurality of subsets of medical records or (ii) a new respective subset of medical records by comparing, for each respective attribute in the set of one or more respective attributes, (i) the corresponding string of text for the respective additional medical record to (ii) a corresponding string of text for each respective subset of medical records in the plurality of medical records to determine whether the respective additional medical record satisfies a corresponding criteria for inclusion in the respective subset of medical records 252 Determine, for the first subset of the plurality of medical records, a corresponding measure of central tendency for the corresponding strings of text for the set of one or more respective attributes.

254 The measure of central tendency for the first subset of the plurality of medical records is a centroid of the first component of the first similarity graph.

FIG. 2F

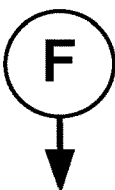

256 Refine the first subset of the plurality of medical records by: determining, for each respective medical record, in a remainder subset of the plurality of medical records, a corresponding pairwise similarity between (i) for each respective attribute in the set of one or more respective attributes, the corresponding strings of text for the respective medical record and (ii) the corresponding measure of central tendency for the first subset of the plurality of medical records, where each respective medical record in the remainder subset is not a member of the first subset; and updating the first subset of the plurality of medical records to include respective medical records, in the remainder subset of the plurality of medical records, with a corresponding pairwise similarity that satisfies a second similarity threshold to generate a first updated subset of the plurality of medical records.

258 The remainder subset of the plurality of medical records comprises all medical records that are not part of the first subset of the plurality of medical records.

260 The remainder subset of the plurality of medical records comprises all medical records that are not part of any identified subset of the plurality of medical records.

262 The corresponding pairwise similarity for the respective medical record in the remainder subset of the plurality of medical records is determined using the same metric of similarity as for the corresponding pairwise similarity for the respective pair of medical records in the plurality of medical records.

264 The second similarity threshold is the same as the first similarity threshold.

266 The corresponding pairwise similarity for the respective medical record in the remainder subset of the plurality of medical records and the measure of central tendency for the first subset of medical records is determined using a different metric of similarity than the metric of similarity used to determine the corresponding pairwise similarity for the respective pair of medical records in the plurality of medical records.

FIG. 2G

268 Determine for the first updated subset of the plurality of medical records, a corresponding measure of central tendency for the corresponding strings of text for the set of one or more respective attributes.

270 Repeat the refining one or more times.

272 Refine the first subset of the plurality of medical records by: determining, for each respective medical record, in the first subset of the plurality of medical records, a corresponding pairwise similarity between (i) for each respective attribute in the set of one or more respective attributes, the corresponding strings of text for the respective medical record and (ii) the corresponding measure of central tendency for the first subset of the plurality of medical records, and updating the first subset of the plurality of medical records to remove respective medical records, in the first subset of the plurality of medical records, with a corresponding pairwise similarity that does not satisfy a third similarity threshold to generate a second updated subset of the plurality of medical records.

274 The third similarity threshold is the same as the first similarity threshold.

282 Determine for the first updated subset of the plurality of medical records, a corresponding measure of central tendency for the corresponding strings of text for the set of one or more respective attributes.

284 Repeat the refining one or more times.

FIG. 2H

276 Refine the second updated subset of the plurality of medical records by: determining, for each respective medical record, in a third subset of the plurality of medical records, a corresponding pairwise similarity between (i) for each respective attribute in the set of one or more respective attributes, the corresponding strings of text for the respective medical record and (ii) a corresponding measure of central tendency for the second updated subset of the plurality of medical records for the corresponding strings of text for the set of one or more respective attributes, where each respective medical record in the third subset is not a member of the second updated subset; and updating the second updated subset of the plurality of medical records to include respective medical records, in the third subset of the plurality of medical records, with a corresponding pairwise similarity that satisfies a fourth similarity threshold to generate a third updated subset of the plurality of medical records.

278 The third subset of the plurality of medical records comprises all medical records that are not part of the second updated subset of the plurality of medical records.

280 The third subset of the plurality of medical records comprises all medical records that are not part of any identified subset of the plurality of medical records.

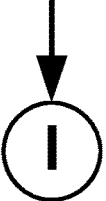

FIG. 2I

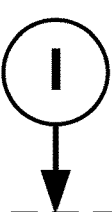

292 Create a grouping template including a mapping of each respective medical record in the first subset of the plurality of medical records to a first group of medical records.

294 A second subset of the plurality of medical records has been identified and the grouping template comprises a mapping of each respective medical record in the second subset of the plurality of medical records to a second group of medical records.

296 Assign a first label for machine learning to each respective medical record in the first group of medical records and a second label for machine learning, that is different than the first label, to the second group of medical records.

298 Automatically assign a first name to the first group of medical records and a second name to the second group of medical records.

2100 Manually assign a first name to the first group of medical records and a second name to the second group of medical records

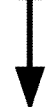

2102 Generate, based on the plurality of medical records, a referential table including a plurality of rows and a plurality of columns, where each respective row in the plurality of rows corresponds to respective medical record in the plurality of medical records and each respective column in the plurality of columns corresponds to a respective attribute in the plurality of attributes.

2118 Store the plurality of medical evaluations in a plurality of folders on the computer system, where a respective folder of the plurality of folders corresponds to a respective grouping of the plurality of groupings.

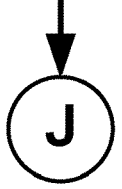

FIG. 2J

246 Train a model using, for each respective medical record in the first subset of the plurality of medical records and each respective medical record in the second subset of the plurality of medical records, at least a portion of the corresponding medical data as independent variables for the training.

248 The training comprises supervised training. The training further uses, (a) a first label for each respective medical record in the first subset of the plurality of medical records and (b) a second label that is different than the first label for each respective medical record in the second subset of the plurality of medical records, as dependent variables for the training.

250 The training comprises unsupervised training.

286 The method generates a plurality of groupings for the plurality of medical evaluations, where each respective grouping in the plurality of groupings comprises a subset of the plurality of medical evaluations and where each respective medical evaluation in the plurality of medical evaluations is present in no more than one respective grouping in the plurality of groupings

288 Determine, for each respective medical evaluation in one or more respective groupings in the plurality of groupings for the plurality of medical evaluations, a respective characteristic in a plurality of characteristics for the respective medical evaluation.

290 Train a model using, for each respective medical evaluation in at least two respective groupings in the plurality of groupings, (i) the corresponding medical data as independent variables for the training and (ii) the respective characteristic as a dependent variable for the training.

Figure 4A:
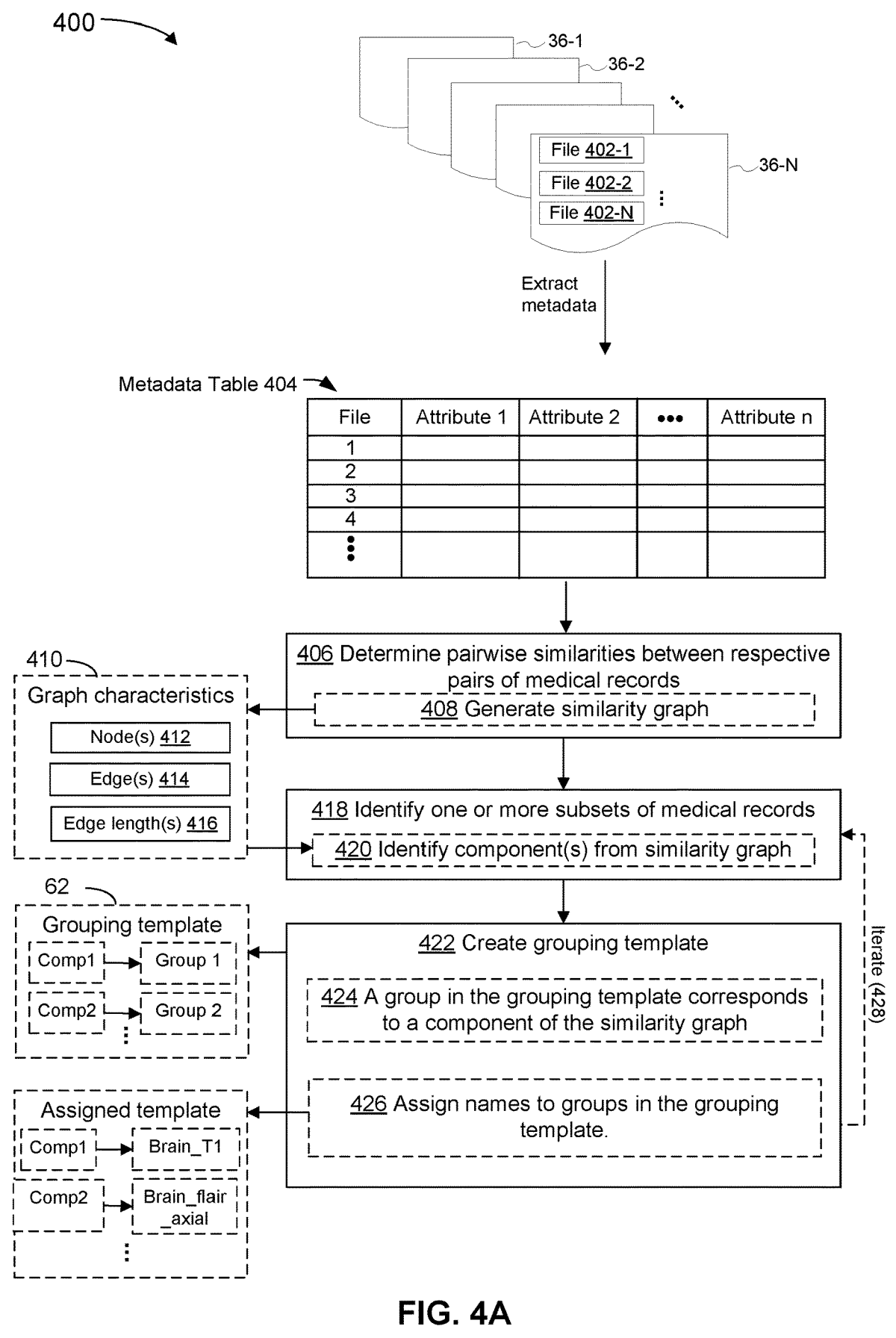

File 402-1
File 402-2
File 402-N

36-N

Extract
metadata

Metadata Table 404

| File | Attribute 1 | Attribute 2 | ●●● | Attribute n |
|------|-------------|-------------|-----|-------------|
| 1 | | | | |
| 2 | | | | |
| 3 | | | | |
| 4 | | | | |
| ⋮ | | | | |

410

Graph characteristics

Node(s) 412

Edge(s) 414

Edge length(s) 416

406 Determine pairwise similarities between respective pairs of medical records

408 Generate similarity graph

418 Identify one or more subsets of medical records

420 Identify component(s) from similarity graph

62

Grouping template

Comp1 → Group 1

Comp2 → Group 2

⋮

422 Create grouping template

424 A group in the grouping template corresponds to a component of the similarity graph

426 Assign names to groups in the grouping template.

Iterate (428)

Assigned template

Comp1 → Brain_T1

Comp2 → Brain_flair _axial

| File | Attribute | | | |
|---|---|---|---|---|
| | ProtocolName 44-3 | ContrastAgent 44-4 | ... | ReconstructionDiameter 44-5 |
| 1 | PANCREATIC-MASS-W-PELVIS-Abdomen 46-3-1 | CONTRAST 46-4-1 | ••• | 450 46-5-1 |
| 2 | CHEST-ABD-PELVIS-Abdomen 46-3-2 | CONTRAST 46-4-2 | | 455 46-5-2 |
| 3 | PANCREATIC-MASS-Abdomen 46-3-3 | CONTRAST 46-4-3 | ••• | 452 46-5-3 |
| 4 | PANCREAS-W-CAP-Abdomen 46-3-4 | OMNI 46-4-4 | | 136 46-5-4 |
| 5 | PANC-CAP-WITH 46-3-5 | Isovue-370 46-4-5 | | 92 46-5-5 |
| ... | ... | ... | | ... |

404 (Partial view)

Pairwise Similarity Determination (Pairwise comparison of values for Attribute "ProtocolName")

430

432

| Pair | Comparison of text strings | Pairwise Similarity |
|---|---|---|
| (1,2) | "PANCREATIC-MASS-W-PELVIS-Abdomen" and "CHEST-ABD-PELVIS-Abdomen" | 0.4 |
| (1,3) | "PANCREATIC-MASS-W-PELVIS-Abdomen" and "PANCREATIC-MASS-Abdomen" | 0.8 △ |
| (1,4) | "PANCREATIC-MASS-W-PELVIS-Abdomen" and "PANCREAS-W-CAP-Abdomen" | 0.7 △ |
| (1,5) | "PANCREATIC-MASS-W-PELVIS-Abdomen" and "PANC-CAP-WITH" | 0.2 |
| (2,3) | "CHEST-ABD-PELVIS-Abdomen" and "PANCREATIC-MASS-Abdomen" | 0.3 |
| (2,4) | "CHEST-ABD-PELVIS-Abdomen" and "PANCREAS-W-CAP-Abdomen" | 0.25 |
| (2,5) | "CHEST-ABD-PELVIS-Abdomen" and "PANC-CAP-WITH" | 0.45 |
| (3,4) | "PANCREATIC-MASS-Abdomen" and "PANCREAS-W-CAP-Abdomen" | 0.7 △ |
| (3,5) | "PANCREATIC-MASS-Abdomen" and "PANC-CAP-WITH" | 0.3 |
| (4,5) | "PANCREAS-W-CAP-Abdomen" and "PANC-CAP-WITH" | 0.7 △ |

Assume threshold similarity is 0.7 (Values with a triangle △ next to them are those that satisfy the threshold similarity)

FIG. 4C

Pairwise Similarity Determination (Pairwise comparison of values for Attributes "ContrastAgent" and "Reconstruction Diameter")

| Pair | Comparison of text strings | Pairwise similarity |
|---|---|---|
| (1,2) | "CONTRAST450" and "CONTRAST455" | 0.9 △ |
| (1,3) | "CONTRAST450" and "CONTRAST452" | 0.9 △ |
| (1,4) | "CONTRAST450" and "OMNI136" | 0.2 |
| (1,5) | "CONTRAST450" and "Isovue-370" | 0.3 |
| (2,3) | "CONTRAST455" and "CONTRAST452" | 0.9 △ |
| (2,4) | "CONTRAST455" and "OMNI136" | 0.2 |
| (2,5) | "CONTRAST455" and "Isovue-370" | 0.1 |
| (3,4) | "CONTRAST452" and "OMNI136" | 0.2 |
| (3,5) | "CONTRAST452" and "Isovue-370" | 0.3 |
| (4,5) | "OMNI136" and "Isovue-370" | 0.45 |

FIG. 4D

Assume threshold similarity is 0.7 (Values with a triangle △ next to them are those that satisfy the threshold similarity)

Grouping Template

| File | Output_Name |
|------|-------------|
| 1 | Pancreas |
| 3 | Pancreas |
| 4 | Pancreas |
| 5 | Pancreas |
| 2 | Other_organ |
| 15 | Kidney |
| 248 | Kidney |
| ... | ... |

First group
434

FIG. 4E

Similarity Graph 500

Edge representing
greatest similarity 414-5

414-1

412-1 — 412-2

412-13

412-3

414-2

412-14   412-15

412-4

414-6

412-12

416-6

412-16

412-5

412-11

412-17

414-3

414-4

412-10

412-6

412-9   412-8   412-7

Similarity Graph 500

First component 502
(First subset of medical
records)

414-1

414-5

412-1

412-2

412-13

414-6

412-3

414-2

412-14

412-15

412-4

412-12

412-16

412-5

412-11

412-17

414-4

412-10

414-3

412-6

412-9

412-8

412-7

Second
component 504
(Second subset
of medical
records)

Similarity Graph 500

First component
502

414-1

414-5

412-1

412-2

506

412-13

414-7

414-9

414-8

412-3

412-14

412-15

414-2

412-12

412-4

412-16

412-11

412-5

412-17

414-4

412-10

414-3

412-6

412-9

412-8

412-7

Similarity Graph 500

Updated first
component 508

414-1

412-1          414-5          412-2

506

412-13          414-7          412-3          414-2

412-14          412-15          412-4

412-12

412-16          412-5

412-11          412-17

414-4          412-10          412-6          414-3

412-9          412-7

412-8

Similarity Graph 510
(partial view)

Similarity Graph 510
(partial view)

Method 600

602 Obtain, in electronic form, a plurality of medical records, where each respective medical record in the plurality of medical records includes (i) corresponding medical data from a respective medical evaluation in a plurality of medical evaluations, and (ii) corresponding metadata comprising, for each respective attribute in a plurality of attributes about the respective medical evaluation, a corresponding string of text, wherein the plurality of medical records comprises 100 or more medical records.

604 Generate a first similarity graph by determining, for each respective pair of medical records in the plurality of medical records, a corresponding pairwise similarity between, for each respective attribute in a set of one or more respective attributes in the plurality of attributes, (i) the corresponding string of text for a first medical record in the respective pair of medical records and (ii) the corresponding string of text for a second medical record in the respective pair of medical records, the first similarity graph having a plurality of nodes and a plurality of edges, where: each respective node in the plurality of nodes corresponds to a respective medical record in the plurality of medical records, and each respective edge in the plurality of edges (i) connects a respective pair of nodes in the plurality of nodes and (ii) has a respective length based on the corresponding pairwise similarity for the respective pair of medical records corresponding to the pair of nodes.

606 Identify a first component of the first similarity graph, corresponding to a first subset of the plurality of medical records, by: a) identifying a first edge, in the plurality of edges, connecting a first pair of nodes, in the plurality of nodes, that represents a greatest similarity between any pair of medical records in the plurality of medical records and adding the first pair of nodes to the first component; b) identifying each respective edge, in the plurality of edges, that (i) is directly connected to one of the first pair of nodes and (ii) has a corresponding length satisfying the first similarity threshold, thereby identifying a first subset of edges, and adding each respective node connected to respective edge in the first subset of edges to the first component; and c) repeating the identifying b) for each respective node added to the first component.

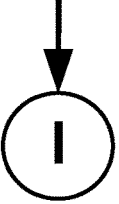

FIG. 6A

608 Identify a second component of the first similarity graph, corresponding to a second subset of the plurality of medical records, where the second subset of the plurality of medical records excludes any of the respective medical records in the first subset of the plurality of medical records, by: a) identifying a second edge, in the plurality of edges, connecting a second pair of nodes, in the plurality of nodes excluding the respective nodes of the first component, that represents a greatest similarity between any pair of medical records in the plurality of medical records excluding the first subset of the plurality of medical records, and adding the second pair of nodes to the second component; b) identifying each respective edge, in the plurality of edges, that (i) is directly connected to one of the second pair of nodes and (ii) has a corresponding length satisfying the first similarity threshold, thereby identifying a second subset of edges, and adding each respective node connected to respective edge in the second subset of edges to the second component; and c) repeating the identifying b) for each respective node added to the second component.

610 Iteratively identify additional components of the first similarity graph wherein, (a) each additional component does not include any of the respective nodes in any previously identified components of the first similarity graph and (b) each respective node in each respective additional component is directly connected to a node of a respective pair of nodes in the each respective additional component and (ii) has a corresponding length satisfying the first similarity threshold

FIG. 6B

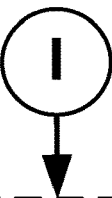

612 Determine a corresponding centroid for the first component of the first similarity graph.

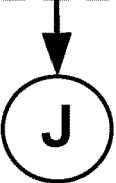

614 Refine the first component of the first similarity graph by: determining, for each respective node, in remainder nodes of the plurality of nodes, a corresponding pairwise similarity between (i) for each respective attribute in the set of one or more respective attributes, the corresponding strings of text (attribute values, metadata values) for the respective medical record and (ii) the corresponding measure of central tendency for the first component, where each respective node in the remainder nodes does not belong to the first component; and updating the first component to include respective nodes, in the remainder nodes, with a corresponding pairwise similarity that satisfies a second similarity threshold to generate a first updated component.

616 Refine the first component by: determining, for each respective node, in the first component, a corresponding pairwise similarity between (i) for each respective attribute in the set of one or more respective attributes, the corresponding strings of text for the respective node and (ii) the corresponding centroid for the first component, where each respective node in the remainder nodes is not a member of the first component; and updating the first component to remove nodes, in the first component, with a corresponding pairwise similarity that does not satisfy a third similarity threshold to generate a second updated component.

FIG. 6C

618 Create a grouping template, where the grouping template comprises a mapping of each respective medical evaluation that corresponds to a node in the first component to a first group of medical records.

GRAPH BASED METADATA STRUCTURING ALGORITHM TO ENABLE MACHINE LEARNING

TECHNICAL FIELD

This application is directed to using metadata structuring algorithms to categorize medical data to enable machine learning.

BACKGROUND

Medical imaging is routinely used in disease diagnosis and treatment. Hussain, S., et al., *Modern Diagnostic Imaging Technique Applications and Risk Factors in the Medical Field: A Review*, BioMed Research International, 2022: 5164970 (2022), which is incorporated herein by reference in its entirety. However, manual interpretation of medical imaging is time consuming, expensive, and subjective. Machine learning (ML) has been applied to medical imaging to perform several tasks, including lesion segmentation, image annotation, diagnosis, and image-guided treatment. However, large, curated data sets are typically required for training effective models for evaluating medical images for a number of reasons. For instance, many ML models used to evaluate medical images rely on a large number of weak input features derived from various determination of pixel, e.g., radiologic features.

While medical imaging data sets can be used to generate models for predicting disease risk, predicting treatment outcomes, recommending personalized therapies, predicting disease recurrence, and the like. Medical data, such as medical imaging data, can be used as training datasets for training the models. In order for the medical data to be available for model training, they need to be structured in a homogenized format, or properly labeled with essential information. However, manual curation of medical imaging data sets is time consuming and expensive.

Most datasets for hospitals have semi-structured data, making machine learning a challenge. Furthermore, significant variability in the original data makes structuring of the data especially difficult. For example, medical imaging datasets that are acquired during medical examinations can have naming schemes that are unique to the clinical site where the data is acquired or can contain user errors. Manual data cleaning and structuring, on the other hand, is very tedious, time-consuming, expensive, error prone, and non-scalable. As an example, a single medical exam, such as an MRI scan or a CT scan, can generate hundreds or thousands of files (e.g., images). Manual processing becomes prohibitively slow and expensive when performed across tens of thousands, hundreds of thousands, or millions of electronic medical data files.

SUMMARY

Given the above background, what is needed in the art are improved methods and systems for categorizing medical data at appropriate scale. The present disclosure provides a technical solution to the technical problem of structuring medical data to enable machine learning. As disclosed herein, an improved method of data structuring uses simple text-based properties in the metadata attributes corresponding to the medical data.

The method determines, for each respective pair of medical records that consists of a first medical records and a second medical record, a corresponding pairwise similarity between string(s) of text (e.g., a string metric) for the first medical record and string(s) of text for the second medical record. The string(s) of text are metadata attributes (e.g., metadata values) od the corresponding medical records.

According to some aspects of the present disclosure, the pairwise similarity is an edit distance. Edit distance is a way of quantifying how similar or dissimilar two strings (e.g., text strings, words, etc.) are to one another, by counting the minimum number of operations required to transform one string into the other.

According to some aspects of the present disclosure, the method identifies one or more groups of medical records. Medical records that are within a respective group are "similar" to one another because they have respective pairwise similarities that each satisfies a similarity threshold.

According to some aspects of the present disclosure, the method is highly customizable and scalable. For example, by defining a stricter similarity threshold, one will be able to identify one or more groups of medical records, wherein records within a respective group are highly similar with respect to one another. As another example, scalability can be achieved by considering multiple attributes simultaneously (e.g., by concatenating strings of text for multiple metadata attributes). This technology can also be adapted to other suitable data cleaning pipelines.

The systems, methods, and devices of this disclosure each have several innovative aspects, no single one of which is solely responsible for the desirable attributes disclosed herein.

According to one aspect of the present disclosure, a method for categorizing medical data is provided. The method includes obtaining, in electronic form, a plurality of medical records. Each respective medical record in the plurality of medical records includes (i) corresponding medical data from a respective medical evaluation in a plurality of medical evaluations and (ii) corresponding metadata comprising, for each respective attribute in a plurality of attributes about the respective medical evaluation, a corresponding string of text. The plurality of medical records comprises 100 or more medical records. The method includes determining, for each respective pair of medical records in the plurality of medical records, a corresponding pairwise similarity between, for each respective attribute in a set of one or more respective attributes in the plurality of attributes, (i) the corresponding string of text for a first medical record in the respective pair of medical records and (ii) the corresponding string of text for a second medical record in the respective pair of medical records. The method includes identifying a first subset of the plurality of medical records. Each respective medical record in the first subset is directly or indirectly connected to each other respective medical record in the first subset through a set of pairwise similarities that each satisfy a first similarity threshold.

In some embodiments, the method includes identifying a second subset of the plurality of medical records. The second subset does not include any of the respective medical records in the first subset of the plurality of medical records and each respective medical record in the second subset is directly or indirectly connected to each other respective medical record in the second subset through a respective set of pairwise similarities that each satisfy the first similarity threshold.

In some embodiments, the method includes iteratively identifying additional subsets of the plurality of medical records. Each additional subset does not include any of the respective medical records in any previously identified subset of the plurality of medical records and each respective medical record in each respective additional subset is directly or indirectly connected to each other respective medical record in the respective additional subset through a respective set of pairwise similarities that each satisfy the first similarity threshold.

In some embodiments, the method includes determining, for the first subset of the plurality of medical records, a corresponding measure of central tendency for the corresponding strings of text for the set of one or more respective attributes.

In some embodiments, the method includes refining the first subset of the plurality of medical records by: determining, for each respective medical record, in a remainder subset of the plurality of medical records, a corresponding pairwise similarity between (i) for each respective attribute in the set of one or more respective attributes, the corresponding strings of text for the respective medical record and (ii) the corresponding measure of central tendency for the first subset of the plurality of medical records, wherein each respective medical record in the remainder subset is not a member of the first subset; and updating the first subset of the plurality of medical records to include respective medical records, in the remainder subset of the plurality of medical records, with a corresponding pairwise similarity that satisfies a second similarity threshold to generate a first updated subset of the plurality of medical records.

In some embodiments, the method includes refining the first subset of the plurality of medical records by: determining, for each respective medical record, in the first subset of the plurality of medical records, a corresponding pairwise similarity between (i) for each respective attribute in the set of one or more respective attributes, the corresponding strings of text for the respective medical record and (ii) the corresponding measure of central tendency for the first subset of the plurality of medical records, wherein each respective medical record in the remainder subset is not a member of the first subset; and updating the first subset of the plurality of medical records to remove respective medical records, in the first subset of the plurality of medical records, with a corresponding pairwise similarity that does not satisfy a third similarity threshold to generate a second updated subset of the plurality of medical records.

In some embodiments, the determining includes generating a first similarity graph that includes a plurality of nodes and a plurality of edges, wherein each respective node in the plurality of nodes corresponds to a respective medical record in the plurality of medical records, and each respective edge in the plurality of edges (i) connects a respective pair of nodes in the plurality of nodes and (ii) has a respective length based on the corresponding pairwise similarity for the respective pair of medical records corresponding to the pair of nodes.

In some embodiments, the first similarity graph is generated by creating a respective node, in the plurality of nodes, for each respective medical record in the plurality of medical records; and creating an edge, in the plurality of edges, between two respective nodes when the corresponding similarity between the pair of medical records corresponding to two respective nodes satisfies the first similarity threshold.

In some embodiments, the method includes creating a grouping template comprising a mapping of each respective medical record in the first subset of the plurality of medical records to a first group of medical records.

Another aspect of the present disclosure provides a method for categorizing medical data. The method includes obtaining, in electronic form, a plurality of medical records. Each respective medical record in the plurality of medical records includes (i) corresponding medical data from a respective medical evaluation in a plurality of medical evaluations, and (ii) corresponding metadata comprising, for each respective attribute in a plurality of attributes about the respective medical evaluation, a corresponding string of text. The plurality of medical records comprises 100 or more medical records. The method includes generating a first similarity graph by determining, for each respective pair of medical records in the plurality of medical records, a corresponding pairwise similarity between, for each respective attribute in a set of one or more respective attributes in the plurality of attributes, (i) the corresponding string of text for a first medical record in the respective pair of medical records and (ii) the corresponding string of text for a second medical record in the respective pair of medical records. The first similarity graph includes a plurality of nodes and a plurality of edges. Each respective node in the plurality of nodes corresponds to a respective medical record in the plurality of medical records. Each respective edge in the plurality of edges (i) connects a respective pair of nodes in the plurality of nodes and (ii) has a respective length based on the corresponding pairwise similarity for the respective pair of medical records corresponding to the pair of nodes. The method includes identifying a first component of the first similarity graph, corresponding to a first subset of the plurality of medical records, by (a) identifying a first edge, in the plurality of edges, connecting a first pair of nodes, in the plurality of nodes, that represents a greatest similarity between any pair of medical records in the plurality of medical records and adding the first pair of nodes to the first component; (b) identifying each respective edge, in the plurality of edges, that (i) is directly connected to one of the first pair of nodes and (ii) has a corresponding length satisfying the first similarity threshold, thereby identifying a first subset of edges, and adding each respective node connected to respective edge in the first subset of edges to the first component; and (c) repeating the identifying (b) for each respective node added to the first component.

In some embodiments, the method includes identifying a second component of the first similarity graph, corresponding to a second subset of the plurality of medical records. The second subset of the plurality of medical records excludes any of the respective medical records in the first subset of the plurality of medical records. The second component of the first similarity graph is identified by: (a) identifying a second edge, in the plurality of edges, connecting a second pair of nodes, in the plurality of nodes excluding the respective nodes of the first component, that represents a greatest similarity between any pair of medical records in the plurality of medical records excluding the first subset of the plurality of medical records, and adding the second pair of nodes to the second component; (b) identifying each respective edge, in the plurality of edges, that (i) is directly connected to one of the second pair of nodes and (ii) has a corresponding length satisfying the first similarity threshold, thereby identifying a second subset of edges, and adding each respective node connected to respective edge in the second subset of edges to the second component; and (c) repeating the identifying (b) for each respective node added to the second component.

In some embodiments, the method includes iteratively identifying additional components of the first similarity graph wherein, (a) each additional component does not include any of the respective nodes in any previously identified components of the first similarity graph and (b) each respective node in each respective additional component is directly connected to a node of a respective pair of nodes in the each respective additional component and has a corresponding length satisfying the first similarity threshold.

In some embodiments, the method includes determining a corresponding centroid for the first component of the first similarity graph.

In some embodiments, the method includes refining the first component of the first similarity graph by: determining, for each respective node, in remainder nodes of the plurality of nodes, a corresponding pairwise similarity between (i) for each respective attribute in the set of one or more respective attributes, the corresponding strings of text for the respective medical record and (ii) the corresponding measure of central tendency for the first component, wherein each respective node in the remainder nodes does not belong to the first component; and updating the first component to include respective nodes, in the remainder nodes, with a corresponding pairwise similarity that satisfies a second similarity threshold to generate a first updated component.

In some embodiments, the method includes refining the first component by: determining, for each respective node, in the first component, a corresponding pairwise similarity between (i) for each respective attribute in the set of one or more respective attributes, the corresponding strings of text for the respective node and (ii) the corresponding centroid for the first component, wherein each respective node in the remainder nodes is not a member of the first component; and updating the first component to remove nodes, in the first component, with a corresponding pairwise similarity that does not satisfy a third similarity threshold to generate a second updated component.

Another aspect of the present disclosure provides a computer system for categorizing medical data. The computer system comprises one or more processors and memory addressable by the one or more processors. The memory stores one or more programs configured to be executed by the one or more processors. The one or more programs singularly or collectively comprise instructions for performing any of the methods described herein.

Another aspect of the present disclosure provides a non-transitory computer readable storage medium. The non-transitory computer readable storage medium stores instructions that, when executed by a computer system, cause the computer system to perform any of the methods described herein.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

In the drawings, embodiments of the systems and method of the present disclosure are illustrated by way of example. It is to be expressly understood that the description and drawings are only for the purpose of illustration and as an aid to understanding, and are not intended as a definition of the limits of the systems and methods of the present disclosure.

FIGS. 1A and 1B illustrate a computer system in accordance with some embodiments of the present disclosure.

FIGS. 2A, 2B, 2C, 2D, 2E, 2F, 2G, 2H, 2I, 2J, and 2K collectively provide a flowchart for an example method for categorizing medical data, in accordance with some embodiments of the present disclosure.

FIG. 4A illustrates conceptually a process of categorizing medical data, in accordance with some embodiments of the present disclosure.

FIG. 4C illustrates an example for determining corresponding pairwise similarity for each respective pair of medical records in the plurality of medical records, in accordance with some embodiments of the present disclosure.

FIG. 4D shows an example for determining corresponding pairwise similarity for each respective pair of medical records in the plurality of medical records, for two attributes, in accordance with some embodiments of the present disclosure.

FIG. 4E illustrates a grouping template in accordance with some embodiments of the present disclosure.

FIGS. 6A, 6B, 6C, and 6D collectively provide a flowchart for an example method for categorizing medical data, in accordance with some embodiments of the present disclosure.

Like reference numerals refer to corresponding parts throughout the several views of the drawings.

DETAILED DESCRIPTION

Figure 3:
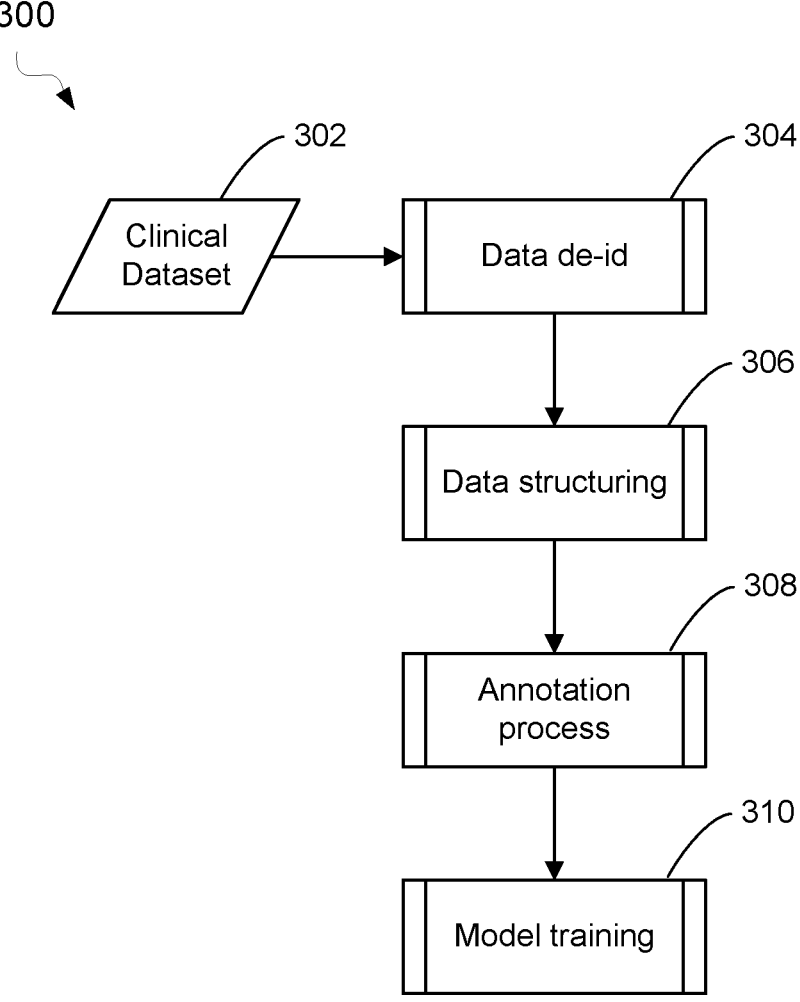
FIG. 3 illustrates a process for preparing a clinical dataset for development of machine learning models, in accordance with some embodiments of the present disclosure.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

Definitions

As used herein, the term "measure of central tendency" refers to a central or representative value for a distribution of values. Non-limiting examples of measures of central tendency include an arithmetic mean, weighted mean, midrange, midhinge, trimean, geometric mean, geometric median, Winsorized mean, median, and mode of the distribution of values.

As used herein, the terms "graph" and "similarity graph" are used interchangeably and refer to a mathematical structure representing a set of items (e.g., a plurality of medical records) in which the members of some pairs of the items (e.g., two medical records) are in related to each other in some fashion, e.g., they have a similarity to each other that satisfies a threshold similarity. For example, in some embodiments, metadata corresponding to two medical records are compared to each other to determine a measure of similarity between the pair of medical records, e.g., by determining an editing distance between the strings of text corresponding to all or a portion of the metadata corresponding to each medical record. The items are represented in the graph by vertices (also called nodes or points) and each of the related pairs of vertices are joined to each other through an edge (also called link or line). In some embodiments, the edge is scaled according to a measure of relatedness (similarity) between the two items. For example, edges connecting a pair of items that are very highly related (very similar) are assigned a small (or large) value and edges connecting a pair of items that are less related are assigned larger (or smaller) values. Graphs can be directional (indicating a directionality to the relationship) or unidirectional. In some embodiments, the graphs described herein are unidirectional.

As used herein, the term "component" refers to a connected subgraph within a similarity graph. A component is made up of all nodes and all edges forming a connected subgraph that is not part of any larger connected subgraph. All nodes of a component are connected to each other, either directly through a shared edge or through a contiguous bridge of one or more intermediary nodes and edges. For example, similarity graph 500 shown in FIG. 5D has a plurality of components including first component 502 and second component 504. In a "fully connected" component, every node in the component shares an edge with every other node in the component. For example, first component 502 is fully connected because each of nodes 412-1, 412-2, and 412-13 is connected to each other node in the component through a shared edge, e.g., edges 414-1, 414-5, and 414-6. In a "partially connected" component, one or more nodes in the component do not share an edge with one or more other nodes in the component. For example, second component 504 is partially connected because nodes 412-8, 412-9, and 412-11 do not share an edge with at least one other node in the component, e.g., node 412-8 does not share an edge with node 412-9.

As used herein, the term "subject" refers to any living or non-living organism including, but not limited to, a human (e.g., a male human, female human, fetus, pregnant female, child, or the like), a non-human mammal, or a non-human animal. Any human or non-human animal can serve as a subject, including but not limited to mammal, reptile, avian, amphibian, fish, ungulate, ruminant, bovine (e.g., cattle), equine (e.g., horse), caprine and ovine (e.g., sheep, goat), swine (e.g., pig), camelid (e.g., camel, llama, alpaca), monkey, ape (e.g., gorilla, chimpanzee), ursid (e.g., bear), poultry, dog, cat, mouse, rat, fish, dolphin, whale and shark. In some embodiments, a subject is a male or female of any age (e.g., a man, a woman, or a child).

As used herein the term "cancer," "cancerous tissue," or "tumor" refers to an abnormal mass of tissue in which the growth of the mass surpasses, and is not coordinated with, the growth of normal tissue, including both solid masses (e.g., as in a solid tumor) or fluid masses (e.g., as in a hematological cancer). A cancer or tumor can be defined as "benign" or "malignant" depending on the following characteristics: degree of cellular differentiation including morphology and functionality, rate of growth, local invasion and metastasis. A "benign" tumor can be well differentiated, have characteristically slower growth than a malignant tumor and remain localized to the site of origin. In addition, in some cases a benign tumor does not have the capacity to infiltrate, invade or metastasize to distant sites. A "malignant" tumor can be a poorly differentiated (anaplasia), have characteristically rapid growth accompanied by progressive infiltration, invasion, and destruction of the surrounding tissue. Furthermore, a malignant tumor can have the capacity to metastasize to distant sites. Accordingly, a cancer cell is a cell found within the abnormal mass of tissue whose growth is not coordinated with the growth of normal tissue. Accordingly, a "tumor sample" refers to a biological sample obtained or derived from a tumor of a subject, as described herein.

As used herein, the term "classification" can refer to any number(s) or other characters(s) that are associated with a particular property of a sample. For example, in some embodiments, the term "classification" can refer to a type of cancer in a subject, a stage of cancer in a subject, a prognosis for a cancer in a subject, a tumor load, a presence of tumor metastasis in a subject, and the like. The classification can be binary (e.g., positive or negative) or have more levels of classification (e.g., a scale from 1 to 10 or 0 to 1). The terms "cutoff" and "threshold" can refer to predetermined numbers used in an operation. For example, a cutoff size can refer to a size above which fragments are excluded. A threshold value can be a value above or below which a particular classification applies. Either of these terms can be used in either of these contexts.

As used herein, an "effective amount" or "therapeutically effective amount" is an amount sufficient to affect a beneficial or desired clinical result upon treatment. An effective amount can be administered to a subject in one or more doses. In terms of treatment, an effective amount is an amount that is sufficient to palliate, ameliorate, stabilize, reverse or slow the progression of the disease, or otherwise reduce the pathological consequences of the disease. The effective amount is generally determined by the physician on a case-by-case basis and is within the skill of one in the art. Several factors are typically taken into account when determining an appropriate dosage to achieve an effective amount. These factors include age, sex and weight of the subject, the condition being treated, the severity of the condition and the form and effective concentration of the therapeutic agent being administered.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "including," "includes," "having," "has," "with," or variants thereof are used in either the detailed description and/or the claims, such terms are intended to be inclusive in a manner similar to the term "comprising."

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject," "user," and "patient" are used interchangeably herein.

Reference will now be made in detail to embodiments, examples of which are illustrated in the accompanying drawings. In the following detailed description, numerous specific details are set forth in order to provide a thorough understanding of the present disclosure, including example systems, methods, techniques, instruction sequences, and computing machine program products that embody illustrative implementations. However, the illustrative discussions below are not intended to be exhaustive or to limit the implementations to the precise forms disclosed. Many modifications and variations are possible in view of the above teachings. The features described herein are not limited by the illustrated ordering of acts or events, as some acts can occur in different orders and/or concurrently with other acts or events.

The implementations provided herein are chosen and described in order to best explain the principles and their practical applications, to thereby enable others skilled in the art to best utilize the various embodiments with various modifications as are suited to the particular use contemplated. In some instances, well-known methods, procedures, components, circuits, and networks have not been described in detail so as not to unnecessarily obscure aspects of the embodiments. In other instances, it will be apparent to one of ordinary skill in the art that the present disclosure may be practiced without one or more of the specific details.

It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that though such a design effort might be complex and time-consuming, it will nevertheless be a routine undertaking of engineering for those of ordering skill in the art having the benefit of the present disclosure.

Example System Embodiments

Disclosed are systems and methods for categorizing medical data to enable machine learning. FIG. 3 illustrates a process 300 for preparing a clinical dataset (e.g., medical data) for development of machine learning models, in accordance with some embodiments. The process 300 includes de-identification of the clinical dataset (step 304) to remove sensitive information. For example, sensitive information can include, and is not limited to, patient name, medical record number, social security number, contact information, and date of birth. After de-identification, the next step is to structure the data (step 306) in homogenized and machine-readable formats. In some embodiments, structured data refers to data that can be managed and searched in a relational database. After data structuring, the clinical dataset undergoes an annotation process (step 308) to obtain a training dataset. Annotation can include linking the medical data to ground truth information (e.g., via labeling), thereby informing the machine algorithms what features to look for. Thereafter, the machine learning models are trained (step 310). The training can include supervised training and/or unsupervised training.

One of the major challenges in preparing clinical datasets for development of machine learning models has to do with data structuring. Most clinical datasets, such as medical images like computed tomography (CT) scans, magnetic resonance imaging (MRI) scans, X-ray images, or ultrasound scans, are either unstructured or semi-structured. According to some embodiments of the present disclosure, unstructured or semi-structured data refers to data whose data types are not searchable in a relational database. Unstructured or semi-structured data is difficult to process and analyze. Additionally, significant variability in the original data makes structuring of the data especially difficult. For example, medical imaging datasets can have naming schemes that are unique to the clinical site, or can contain user errors. Manual data cleaning and structuring is very tedious, time-consuming, expensive, error prone, and non-scalable.

Accordingly, what is needed are improved methods and systems for categorizing medical data at appropriate scale. FIG. 4A illustrates, at a high level, a process 400 of structuring (e.g., categorizing) medical data to enable machine learning, in accordance with some embodiments of the present disclosure. The process 400 includes obtaining, e.g., from hospitals, clinics, and/or research institutions, a plurality of medical records 36 (e.g., patient records). In some embodiments, the plurality of medical records comprises at least 100 medical records. In some embodiments, a medical record 36 is a medical imaging file comprising plurality of (e.g., hundreds, thousands, tens of thousands of data files) data files 402. For example, a medical evaluation, such as a CT scan of a patient, can generate hundreds or thousands of files, where each respective file corresponds to an image slice of the CT scan.

FIG. 4A shows that in some embodiments, the process 400 includes extracting metadata from the medical records (e.g., from the files 402, for each data file). The metadata contains attributes about a respective medical evaluation, such as an exam description, an imaging modality, a description of the medical evaluation, and conditions used to obtain the data corresponding to the medical evaluation. In some embodiments, the process 400 includes generating a metadata table 404 based on the extracted attributes. The process 400 proceeds to determine (406) pairwise similarities between respective pairs of medical records, for each attribute in a set of one or more attributes. In some embodiments, a similarity graph is generated (408) to facilitate the determination. In some embodiments, the process 400 includes identifying (418) one or more subsets of medical records. Each respective medical record in the first subset is directly or indirectly connected to each other respective medical record in the first subset through a set of pairwise similarities that each satisfy a first similarity threshold. In some embodiments, where a similarity graph has been generated (in step 408), the one or more subsets of medical records are identified (420) via one or more components from the similarity graph. In some embodiments, the process 400 includes creating (422) one or more grouping templates 62. In some embodiments, a group in the grouping template corresponds (424) to a component of the similarity graph. In some embodiments, the process 400 includes assigning (426) names to the one or more groups in the grouping template. In some embodiments, the process includes iteratively (428) identifying one or more subsets of medical records. In some embodiments, the process further includes training a model using the identified one or more subsets of medical records, where at least a portion of the medical data, corresponding to the one or more subsets of medical records, is used as independent variables for the training.

Now that an overview of improved systems and methods for structuring medical data to enable machine learning has been presented, additional details of systems, devices, and/or processes in accordance with the present disclosure are now described in relation to FIGS. 1, 2, 4, 5, and 6.

FIG. 1A illustrates a computer system for categorizing medical data (e.g., structuring medical data for machine learning), in accordance with some embodiments of the present disclosure.

In typical embodiments, computer system 100 comprises one or more computers. For purposes of illustration in FIG. 1A, the computer system 100 is represented as a single computer that includes all of the functionality of the disclosed computer system 100. However, the present disclosure is not so limited. The functionality of the computer system 100 may be spread across any number of networked computers and/or reside on each of several networked computers and/or virtual machines. One of skill in the art will appreciate that a wide array of different computer topologies are possible for the computer system 100 and all such topologies are within the scope of the present disclosure.

Turning to FIG. 1A with the foregoing in mind, the computer system 100 comprises one or more processing units (CPUs) 59, a network or other communications interface 84, a user interface 78 (e.g., including an optional display 82 and optional keyboard 80 or other form of input device), a memory 92 (e.g., random access memory, persistent memory, or combination thereof), one or more magnetic disk storage and/or persistent devices 90 optionally accessed by one or more controllers 88, one or more communication busses 12 for interconnecting the aforementioned components, and a power supply 79 for powering the aforementioned components. To the extent that components of memory 92 are not persistent, data in memory 92 can be seamlessly shared with non-volatile memory 90 or portions of memory 92 that are non-volatile or persistent using known computing techniques such as caching. Memory 92 and/or memory 90 can include mass storage that is remotely located with respect to the central processing unit(s) 59. In other words, some data stored in memory 92 and/or memory 90 may in fact be hosted on computers that are external to computer system 100 but that can be electronically accessed by the computer system 100 over network 102 (e.g., an Internet, intranet, or other form of network or electronic cable) using network interface 84. In some embodiments, the computer system 100 makes use of models that are run from the memory associated with one or more graphical processing units in order to improve the speed and performance of the system. In some alternative embodiments, the computer system 100 makes use of models that are run from memory 92 rather than memory associated with a graphical processing unit.

The memory 92 of the computer system 100 stores:

an operating system 30 that includes procedures for handling various basic system services;

a communication module 34, which connects to and communicates with other network devices (e.g., a local network, such as a router that provides Internet connectivity, networked storage devices, network routing devices, server systems, other computer systems 100, and/or other connected devices) coupled to one or more communication networks via the network interface 84 (e.g., wired or wireless);

medical records 36. In some embodiments, the medical records 36 comprise medical records that have been de-identified. In some embodiments, the medical records 36 are records that have yet to be de-identified; in this case, the medical records 36 undergo the data de-identification process as described in step 302 of FIG. 3. In some embodiments, the computer system 100 includes at least one hundred medical records 36. In some embodiments, the medical records 36 comprise unstructured or semi-structured data. FIG. 1B is a block diagram illustrating further details of the medical records 36 in accordance with some embodiments. In some embodiments, a respective medical record 36 includes many (e.g., at least 10, at least 20, at least 50, at least 100) medical evaluations 38. For example, a medical record (e.g., a patient's record) can include numerous medical evaluations such as a CT scan, an MRI scan, blood tests, glucose tests, etc. A respective medical evaluation includes corresponding medical data 40 from a respective medical evaluation and corresponding metadata 42. The metadata 42 includes a plurality of attributes 44 (e.g., metadata attributes), and values 46 (e.g., attribute value) corresponding to the metadata attributes 44. In some embodiments, each medical data file includes corresponding metadata 42 with at least 10, 25, or 30 attributes. In some embodiments, each of the attributes 44 corresponds to a respective string of text (including letters, numbers, and/or special characters);

one or more folders 48 for storing the medical evaluations 38 after they have been categorized into groupings. In some embodiments, a respective folder 48 in the one or more folders 48 corresponds to a respective grouping;

a metadata table 404, which is described in further detail with respect to FIGS. 4A, 4B, 4C, and 4D. In some embodiments, the metadata table 404 includes a plurality of data rows and a plurality of data columns. Each of the data rows corresponds to a respective file 402 (or a respective medical record 36). Each of the data columns corresponds to a respective attribute (e.g., metadata attribute 46) of the respective file 402. The metadata table 404 includes data cells, each formed by the intersection between a respective data row and a respective data column. Each of the data cells corresponds to a respective attribute value (e.g., metadata attribute value 46). In some embodiments, the attribute value is a string of text;

a data categorization application 50 (e.g., an algorithm) for obtaining, in electronic form, the medical records 36. In some embodiments, the data categorization application 50 determines, for each respective pair of medical records in the medical records 36, consisting of a first medical record in the respective pair of medical records and a second medical records in the respective pair of medical records, a corresponding pairwise similarity (e.g., an edit distance 60) between, for each respective attribute in a set of one or more respective attributes in the plurality of attributes, a corresponding string of text for the first medical records and the corresponding string of text for the second medical record. In some embodiments, the data categorization application 50 includes:

a graphical user interface 52 for a user to construct groupings of medical records. For example, in some embodiments, a user selects medical records 36 (which may be stored on the computer system or stored remotely) that the user would like the computer system 100 to categorize. In some embodiments, a user assigns, via input to the graphical user interface 52, one or more names to one or more groups in the grouping templates 62;

a graphing module 56 for generating one or more similarity graphs. This is described in detail with respect to FIG. 5); and a natural language processor 58 for processing strings of text for the medical records 36;

one or more edit distances 60 (e.g., edit distance 1 60-1). In some embodiments, the one or more edit distances includes one or more of: a Levenshtein distance, a Jaro-Winkler distance, a Damerau-Levenshtein distance, a Jaccard distance, and a scaled or weighted version thereof;

optionally, one or more connected graphs 61, which are described in further detail in FIGS. 5A to 5H;

optionally, one or more grouping templates 62. In some embodiments, a respective grouping template comprises a mapping of a respective subset of medical records to a respective group of medical records;

one or more models 64. In some embodiments, the one or more models 64 are trained using one or more subsets of medical records that are identified in accordance with the various embodiments of the present disclosure. In some embodiments, at least a portion of the medical data, corresponding to the one or more identified subsets of medical records, is used as independent variables for the training;

optionally, a training module 66 that includes labels 68 and one or more training datasets 70, for training the models 64.

In some embodiments, one or more of the above identified data elements or modules of the computer system 100 are stored in one or more of the previously mentioned memory devices, and correspond to a set of instructions for performing a function described above. The above identified data, modules or programs (e.g., sets of instructions) need not be implemented as separate software programs, procedures or modules, and thus various subsets of these modules may be combined or otherwise re-arranged in various implementations. In some implementations, the memory 92 and/or 90 optionally stores a subset of the modules and data structures identified above. Furthermore, in some embodiments the memory 92 and/or 90 stores additional modules and data structures not described above. Details of the modules and data structures identified above are further described below in reference to FIGS. 2-6.

FIGS. 2A-2K collectively provide a flowchart for an example method 200 for categorizing medical data, in accordance with some embodiments. In some embodiments, the method 200 is performed at a computer system 100 that includes one or more processors (e.g., CPU 59) and memory (e.g., memory 90 or memory 92). In some embodiments, a user initiates, at the computer system 100, an instruction to start the data categorization application 50. In some embodiments, the computer system 100 performs the steps as noted in FIG. 2.

Referring to block 202 in FIG. 2, in some embodiments, the method 200 includes obtaining, in electronic form, a plurality of medical records 36, where each respective medical record in the plurality of medical records 36 includes (i) corresponding medical data 40 from a respective medical evaluation in a plurality of medical evaluations 38, and (ii) corresponding metadata 42 including, for each respective attribute in a corresponding plurality of attributes 44 about the respective medical evaluation, a corresponding string of text (e.g., attribute value 46). In some embodiments, the plurality of medical records comprises 100 or more medical records (203). This is also illustrated in FIG. 4A.

In some embodiments, the plurality of medical records is at least 50 records, at least 100 records, at least 250 records, at least 500 records, at least 1000 records, at least 2500 records, at least 5000 records, at least 10,000 records, at least 25,000 records, at least 50,000 records, at least 100,000 records, at least 250,000 records, at least 500,000 records, at least 1 million records, at least 2.5 million records, at least 5 million records, at least 10 million records, at least 25 million records, at least 50 million records, at least 100 million records, at least 250 million records, at least 500 million records, or more records.

In some embodiments, the plurality of medical records is no more than 1 billion records, no more than 500 million records, no more than 250 million records, no more than 100 million records, no more than 50 million records, no more than 25 million records, no more than 10 million records, no more than 2.5 million records, no more than 1 million records, no more than 500,000 records, no more than 250,000 records, no more than 100,000 records, no more than 50,000 records, no more than 25,000 records, no more than 10,000 records, or fewer records.

In some embodiments, the plurality of medical records is from 50 records to 1 billion records, from 100 records to 1 billion records, from 250 records to 1 billion records, from 500 records to 1 billion records, from 1000 records to 1 billion records, from 2500 records to 1 billion records, from 5000 records to 1 billion records, from 10,000 records to 1 billion records, from 25,000 records to 1 billion records, from 50,000 records to 1 billion records, from 100,000 records to 1 billion records, from 250,000 records to 1 billion records, from 500,000 records to 1 billion records, from 1 million records to 1 billion records, from 2.5 million records to 1 billion records, from 5 million records to 1 billion records, from 10 million records to 1 billion records, from 25 million records to 1 billion records, from 50 million records to 1 billion records, from 100 million records to 1 billion records, from 250 million records to 1 billion records, or from 500 million records to 1 billion records.

In some embodiments, the plurality of medical records is from 50 records to 250 million records, from 100 records to 250 million records, from 250 records to 250 million records, from 500 records to 250 million records, from 1000 records to 250 million records, from 2500 records to 250 million records, from 5000 records to 250 million records, from 10,000 records to 250 million records, from 25,000 records to 250 million records, from 50,000 records to 250 million records, from 100,000 records to 250 million records, from 250,000 records to 250 million records, from 500,000 records to 250 million records, from 1 million records to 250 million records, from 2.5 million records to 250 million records, from 5 million records to 250 million records, from 10 million records to 250 million records, from 25 million records to 250 million records, from 50 million records to 250 million records, or from 100 million records to 250 million records.

In some embodiments, the plurality of medical records is from 50 records to 50 million records, from 100 records to 50 million records, from 250 records to 50 million records, from 500 records to 50 million records, from 1000 records to 50 million records, from 2500 records to 50 million records, from 5000 records to 50 million records, from 10,000 records to 50 million records, from 25,000 records to 50 million records, from 50,000 records to 50 million records, from 100,000 records to 50 million records, from 250,000 records to 50 million records, from 500,000 records to 50 million records, from 1 million records to 50 million records, from 2.5 million records to 50 million records, from 5 million records to 50 million records, from 10 million records to 50 million records, or from 25 million records to 50 million records.

In some embodiments, the plurality of medical records is from 50 records to 10 million records, from 100 records to 10 million records, from 250 records to 10 million records, from 500 records to 10 million records, from 1000 records to 10 million records, from 2500 records to 10 million records, from 5000 records to 10 million records, from 10,000 records to 10 million records, from 25,000 records to 10 million records, from 50,000 records to 10 million records, from 100,000 records to 10 million records, from 250,000 records to 10 million records, from 500,000 records to 10 million records, from 1 million records to 10 million records, from 2.5 million records to 10 million records, or from 5 million records to 10 million records.

In some embodiments, the plurality of medical records is from 50 records to 2.5 million records, from 100 records to 2.5 million records, from 250 records to 2.5 million records, from 500 records to 2.5 million records, from 1000 records to 2.5 million records, from 2500 records to 2.5 million records, from 5000 records to 2.5 million records, from 10,000 records to 2.5 million records, from 25,000 records to 2.5 million records, from 50,000 records to 2.5 million records, from 100,000 records to 2.5 million records, from 250,000 records to 2.5 million records, from 500,000 records to 2.5 million records, or from 1 million records to 2.5 million records.

In some embodiments, the plurality of medical records is from 50 records to 500,000 records, from 100 records to 500,000 records, from 250 records to 500,000 records, from 500 records to 500,000 records, from 1000 records to 500,000 records, from 2500 records to 500,000 records, from 5000 records to 500,000 records, from 10,000 records to 500,000 records, from 25,000 records to 500,000 records, from 50,000 records to 500,000 records, from 100,000 records to 500,000 records, or from 250,000 records to 500,000 records.

Referring to block 208, in some embodiments, the plurality of medical records comprises a plurality of medical image files. In some embodiments, each respective medical record in the plurality of medical records comprises a medical imaging dataset.

In some embodiments, the plurality of medical records comprises a plurality of X-ray image sets, a plurality of computed tomography (CT) image sets, a plurality of positron emission tomography (PET) image sets, a plurality of magnetic resonance imaging (MRI) image sets, a plurality of single-photon emission computed tomography (SPECT) image sets, a plurality of mammography image sets, a plurality of sonography (ultrasound) image sets, or a combination thereof. For a review of medical imaging techniques used in diagnostics see, for example, Hussain, S., et al., *Modern Diagnostic Imaging Technique Applications and Risk Factors in the Medical Field: A Review*, BioMed Research International, 2022:5164970 (2022), which is incorporated herein by reference in its entirety.

Many of the medical imaging modalities used in diagnostics generate datasets made up of multiple images. For example, CT scans use a rotating x-ray tube to take multiple images at different angles which can be processed to generate 2-dimensional or 3-dimensional tomographic images of a region of interest. Depending on the specific implementation and region of interest being imaged, CT scans can generate tens to thousands of images. Similarly, MRI scans acquire image slices of a region of interest. Depending on the specific implementation and region of interest being imaged, MRI scans can generate tens to thousands of images.

Accordingly, in some embodiments, the plurality of medical records collectively comprises at least 50 medical images, at least 100 medical images, at least 250 medical images, at least 500 medical images, at least 1000 medical images, at least 2500 medical images, at least 5000 medical images, at least 10,000 medical images, at least 25,000 medical images, at least 50,000 medical images, at least 100,000 medical images, at least 250,000 medical images, at least 500,000 medical images, at least 1 million medical images, at least 2.5 million medical images, at least 5 million medical images, at least 10 million medical images, at least 25 million medical images, at least 50 million medical images, at least 100 million medical images, at least 250 million medical images, at least 500 million medical images, or more medical images.

In some embodiments, the plurality of medical records collectively comprises no more than 100 billion medical images, no more than 50 billion medical images, no more than 25 billion medical images, no more than 10 billion medical images, no more than 5 billion medical images, no more than 2.5 billion medical images, no more than 1 billion medical images, no more than 500 million medical images, no more than 250 million medical images, no more than 100 million medical images, no more than 50 million medical images, no more than 25 million medical images, no more than 10 million medical images, no more than 2.5 million medical images, no more than 1 million medical images, no more than 500,000 medical images, no more than 250,000 medical images, no more than 100,000 medical images, no more than 50,000 medical images, no more than 25,000 medical images, no more than 10,000 medical images, or fewer medical images.

In some embodiments, the plurality of medical records collectively comprises from 50 medical images to 100 billion medical images, from 100 medical images to 100 billion medical images, from 250 medical images to 100 billion medical images, from 250 medical images to 100 billion medical images, from 500 medical images to 100 billion medical images, from 1000 medical images to 100 billion medical images, from 2500 medical images to 100 billion medical images, from 5000 medical images to 100 billion medical images, from 10,000 medical images to 100 billion medical images, from 25,000 medical images to 100 billion medical images, from 50,000 medical images to 100 billion medical images, from 100,000 medical images to 100 billion medical images, from 250,000 medical images to 100 billion medical images, from 500,000 medical images to 100 billion medical images, from 1 million medical images to 100 billion medical images, from 2.5 million medical images to 100 billion medical images, from 5 million medical images to 100 billion medical images, from 10 million medical images to 100 billion medical images, from 25 million medical images to 100 billion medical images, from 50 million medical images to 100 billion medical images, from 100 million medical images to 100 billion medical images, from 250 million medical images to 100 billion medical images, from 500 million medical images to 100 billion medical images, from 1 billion medical images to 100 billion medical images, from 2.5 billion medical images to 100 billion medical images, from 5 billion medical images to 100 billion medical images, from 10 billion to 100 billion medical images, from 25 billion to 100 billion medical images, or from 50 billion to 100 billion medical images.

In some embodiments, the plurality of medical records collectively comprises from 50 medical images to 25 billion medical images, from 100 medical images to 25 billion medical images, from 250 medical images to 25 billion medical images, from 500 medical images to 25 billion medical images, from 1000 medical images to 25 billion medical images, from 2500 medical images to 25 billion medical images, from 5000 medical images to 25 billion medical images, from 10,000 medical images to 25 billion medical images, from 25,000 medical images to 25 billion medical images, from 50,000 medical images to 25 billion medical images, from 100,000 medical images to 25 billion medical images, from 250,000 medical images to 25 billion medical images, from 500,000 medical images to 25 billion medical images, from 1 million medical images to 25 billion medical images, from 2.5 million medical images to 25 billion medical images, from 5 million medical images to 25 billion medical images, from 10 million medical images to 25 billion medical images, from 25 million medical images to 25 billion medical images, from 50 million medical images to 25 billion medical images, from 100 million medical images to 25 billion medical images, from 250 million medical images to 25 billion medical images, from 500 million medical images to 25 billion medical images, from 1 billion medical images to 25 billion medical images, from 2.5 billion medical images to 25 billion medical images, from 5 billion medical images to 25 billion medical images, or from 10 billion to 25 billion medical images.

In some embodiments, the plurality of medical records collectively comprises from 50 medical images to 5 billion medical images, from 100 medical images to 5 billion medical images, from 250 medical images to 5 billion medical images, from 500 medical images to 5 billion medical images, from 1000 medical images to 5 billion medical images, from 2500 medical images to 5 billion medical images, from 5000 medical images to 5 billion medical images, from 10,000 medical images to 5 billion medical images, from 25,000 medical images to 5 billion medical images, from 50,000 medical images to 5 billion medical images, from 100,000 medical images to 5 billion medical images, from 250,000 medical images to 5 billion medical images, from 500,000 medical images to 5 billion medical images, from 1 million medical images to 5 billion medical images, from 2.5 million medical images to 5 billion medical images, from 5 million medical images to 5 billion medical images, from 10 million medical images to 5 billion medical images, from 25 million medical images to 5 billion medical images, from 50 million medical images to 5 billion medical images, from 100 million medical images to 5 billion medical images, from 250 million medical images to 5 billion medical images, from 500 million medical images to 5 billion medical images, from 1 billion medical images to 5 billion medical images, or from 2.5 billion medical images to 5 billion medical images.

In some embodiments, the plurality of medical records collectively comprises from 50 medical images to 1 billion medical images, from 100 medical images to 1 billion medical images, from 250 medical images to 1 billion medical images, from 500 medical images to 1 billion medical images, from 1000 medical images to 1 billion medical images, from 2500 medical images to 1 billion medical images, from 5000 medical images to 1 billion medical images, from 10,000 medical images to 1 billion medical images, from 25,000 medical images to 1 billion medical images, from 50,000 medical images to 1 billion medical images, from 100,000 medical images to 1 billion medical images, from 250,000 medical images to 1 billion medical images, from 500,000 medical images to 1 billion medical images, from 1 million medical images to 1 billion medical images, from 2.5 million medical images to 1 billion medical images, from 5 million medical images to 1 billion medical images, from 10 million medical images to 1 billion medical images, from 25 million medical images to 1 billion medical images, from 50 million medical images to 1 billion medical images, from 100 million medical images to 1 billion medical images, from 250 million medical images to 1 billion medical images, or from 500 million medical images to 1 billion medical images.

In some embodiments, the plurality of medical records collectively comprises from 50 medical images to 250 million medical images, from 100 medical images to 250 million medical images, from 250 medical images to 250 million medical images, from 500 medical images to 250 million medical images, from 1000 medical images to 250 million medical images, from 2500 medical images to 250 million medical images, from 5000 medical images to 250 million medical images, from 10,000 medical images to 250 million medical images, from 25,000 medical images to 250 million medical images, from 50,000 medical images to 250 million medical images, from 100,000 medical images to 250 million medical images, from 250,000 medical images to 250 million medical images, from 500,000 medical images to 250 million medical images, from 1 million medical images to 250 million medical images, from 2.5 million medical images to 250 million medical images, from 5 million medical images to 250 million medical images, from 10 million medical images to 250 million medical images, from 25 million medical images to 250 million medical images, from 50 million medical images to 250 million medical images, or from 100 million medical images to 250 million medical images.

In some embodiments, the plurality of medical records collectively comprises from 50 medical images to 50 million medical images, from 100 medical images to 50 million medical images, from 250 medical images to 50 million medical images, from 500 medical images to 50 million medical images, from 1000 medical images to 50 million medical images, from 2500 medical images to 50 million medical images, from 5000 medical images to 50 million medical images, from 10,000 medical images to 50 million medical images, from 25,000 medical images to 50 million medical images, from 50,000 medical images to 50 million medical images, from 100,000 medical images to 50 million medical images, from 250,000 medical images to 50 million medical images, from 500,000 medical images to 50 million medical images, from 1 million medical images to 50 million medical images, from 2.5 million medical images to 50 million medical images, from 5 million medical images to 50 million medical images, from 10 million medical images to 50 million medical images, or from 25 million medical images to 50 million medical images.

Figure 4B:
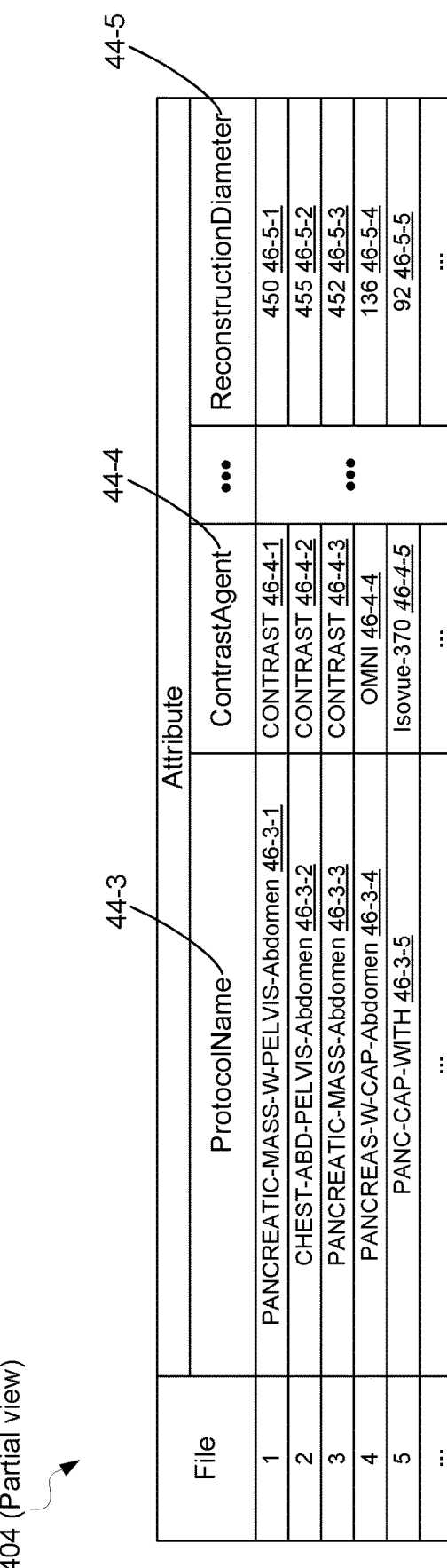
FIG. 4B illustrates a partial view of a metadata table, in accordance with some embodiments of the present disclosure.

Referring to block 210, in some embodiments, the method 200 includes comparing metadata (e.g., metadata 42-1 as illustrated in FIG. 1B) between respective medical records (e.g., respective pairs of files 1-5 as illustrated in FIG. 4B) to determine, for each respective pair of medical records in the plurality of medical records, a corresponding pairwise similarity between, for each respective attribute in a set of one or more respective attributes (e.g., one or more attribute 44 as illustrated in FIG. 4B), (i) the corresponding string of text (e.g., a string of text 46 as illustrated in FIG. 4B) for a first medical record in the respective pair of medical records and (ii) the corresponding string of text for a second medical record in the respective pair of medical record (e.g., for a pairwise comparison of file 1 with file 2 in FIG. 4B, text string 46-3-1 may be compared to text string 46-3-2).

Referring to block 204, in some embodiments, the set of one or more respective attributes 44 comprises an annotated description of a type of medical evaluation (e.g., a human-labeled attribute, a human-derived name, annotated/entered by a technician at record generation). In some embodiments, the annotated description of the type of medical evaluation comprises a description of an identity of a medical imaging modality (e.g., indicating that a medical image was collected using X-ray, PET, CT, MRI, SPECT, mammography, ultrasound, or another imaging modality). In some embodiments, the annotated description of the type of medical evaluation comprises a description of a region of interest being imaged. In some embodiments, the annotated description of the type of medical evaluation comprises a description of an imaging protocol used to acquire a medical image set.

Referring to block 206, in some embodiments, the set of one or more respective attributes comprises an attribute selected from the group consisting of an exam description, an imaging modality, an image slice thickness, an image acquisition time, use of a contrast agent, a distance between a source and a patient, and a description of the medical evaluation.

In some embodiments, the set of one or more respective attributes comprises an attribute selected from PatientSex, LargestImagePixelValue, AccessionNumber, BodyPartExamined, StudyDate, DistanceSourceToPatient, Modality, SpiralPitchFactor, SeriesNumber, DataCollectionDiameter, Code Value, HighBit, ReconstructionDiameter, GantryDetectorTilt, KVP, StudyTime, GeneratorPower, Columns, SliceLocation, CodeMeaning. BitsStored, ContrastBolusTotalDose, ConvolutionKernel, ContrastBolusIngredientConcentration, Rows, ImageOrientationPatient, TableHeight, ContrastBolusRoute, TableSpeed, PixelSpacing, AcquisitionDate Time, TableFeedPerRotation, ImagePositionPatient, RescaleIntercept, ProtocolName, ContrastBolusAgent, ExposureTime, Manufacturer, DistanceSourceToDetector, PatientID, ContrastBolus Volume, ContrastFlowDuration, RotationDirection, AcquisitionTime, SeriesDescription, CTDIvol, BitsAllocated, EstimatedDoseSaving, Exposure, PatientPosition, Study Description, XRayTubeCurrent, RescaleSlope, SliceThickness, AcquisitionType, ContrastFlowRate, RescaleType, SeriesInstanceUID, StudyInstanceUID, PatientAge, slice_pos, IPP_distance, Orientation, SeriesCount, SeriesDescription, and StudyDescription. More comprehensive lists of standard dicom metadata tags used across CT, PET, MRI, and other imaging modalities are known in the art, for example as can be accessed at the URL dicomlibrary.com/dicom/dicom-tags/.

In some embodiments, the set of one or more respective attributes comprises seriesDescription and/or StudyDescription. These are particularly informative metadata fields to group on because they are typically free text with little uniformity used between different lab technicians.

To illustrate, refer to FIG. 4A, which shows that in some embodiments, the computer system 100 extracts the metadata attributes for each medical data file (e.g., medical evaluation or medical record) and generates a metadata table 404. The metadata table 404 includes a plurality of data rows and a plurality of data columns. Each of the data rows corresponds to a respective file 402 (e.g., a medical data file, a medical record 36, or a medical evaluation). Each of the data columns corresponds to a respective attribute (e.g., metadata attribute 46) of the respective file 402. The metadata table 404 includes data cells that are formed by the intersection of a respective data row and a respective data column. Each of the data cells corresponds to a respective attribute value (e.g., metadata attribute value 46). In some embodiments, the attribute value is a string of text.

To further elaborate, FIG. 4B shows a partial view of a metadata table 404 that includes five rows, corresponding to five medical records (e.g., files), namely: file 1, file 2, file 3, file 4, and file 5. Each of the medical records in FIG. 4B includes three attributes, namely: ProtocolName 44-3, ContrastAgent 44-4, and ReconstructionDiameter 44-5. Each of the data cells in the metadata table 404 is a string of text (e.g., an attribute value, a metadata attribute value, etc.) corresponding to the respective attributes. For example, FIG. 4B shows that file 1 has a string of text 46-3-1 "PANCREATIC-MASS-W-PELVIS-Abdomen" corresponding to the attribute ProtocolName 44-3, a string of text 46-4-1 "CONTRAST" corresponding to the attribute ContrastAgent 44-4, and a string of text 46-5-1 "450" corresponding to the attribute ReconstructionDiameter 44-5.

FIG. 4C illustrates an example for determining, based on the partial metadata table 404 in FIG. 4B, corresponding pairwise similarity for each respective pair of medical records in the medical records 36. In this example, the computer system 100 first identifies respective pairs of medical records. For instance, pair (1,2) in FIG. 4C denotes a pair of medical records consisting of medical record 1 (file 1) and medical record 2 (file 2). For each respective pair of medical records, the computer system 100 compares the string of text for each respective attribute in a set of one or more respective attributes. Because the set of attributes consists of a single attribute 44-3 "ProtocolName" in the example of FIG. 4C, the computer system compares, for pair (1,2), (i) the string of text 46-3-1 "PANCREATIC-MASS-W-PELVIS-Abdomen," corresponding to the attribute 44-3 "ProtocolName" for file 1 with (ii) the string of text 46-3-2 "CHEST-ABD-PELVIS-Abdomen," corresponding to the attribute 44-3 "ProtocolName" for file 2. The computing device 100 determines a respective pairwise similarity for each respective pair of medical records in the medical records 36 for the attribute 44-3 "ProtocolName." For example, in FIG. 4C, the computer system 100 determines that the string of text 46-3-1 and the string of text 46-3-2 have a pairwise similarity of 0.4.

Although the example of FIG. 4B shows five data rows (corresponding to five medical records) and three attributes, the metadata table can include at least 100, 1000, tens of thousands, or hundreds of thousands of data rows in an actual scenario (each data row representing a respective medical record).

Accordingly, in some embodiments, method 200 comprises extracting metadata from the plurality of medical rows and generating a metadata table comprising at least 50 rows, at least 100 rows, at least 250 rows, at least 500 rows, at least 1000 rows, at least 2500 rows, at least 5000 rows, at least 10,000 rows, at least 25,000 rows, at least 50,000 rows, at least 100,000 rows, at least 250,000 rows, at least 500,000 rows, at least 1 million rows, at least 2.5 million rows, at least 5 million rows, at least 10 million rows, at least 25 million rows, at least 50 million rows, at least 100 million rows, at least 250 million rows, at least 500 million rows, or more rows.

In some embodiments, the table includes no more than 1 billion rows, no more than 500 million rows, no more than 250 million rows, no more than 100 million rows, no more than 50 million rows, no more than 25 million rows, no more than 10 million rows, no more than 2.5 million rows, no more than 1 million rows, no more than 500,000 rows, no more than 250,000 rows, no more than 100,000 rows, no more than 50,000 rows, no more than 25,000 rows, no more than 10,000 rows, or fewer rows.

In some embodiments, the table includes from 50 rows to 1 billion rows, from 100 rows to 1 billion rows, from 250 rows to 1 billion rows, from 500 rows to 1 billion rows, from 1000 rows to 1 billion rows, from 2500 rows to 1 billion rows, from 5000 rows to 1 billion rows, from 10,000 rows to 1 billion rows, from 25,000 rows to 1 billion rows, from 50,000 rows to 1 billion rows, from 100,000 rows to 1 billion rows, from 250,000 rows to 1 billion rows, from 500,000 rows to 1 billion rows, from 1 million rows to 1 billion rows, from 2.5 million rows to 1 billion rows, from 5 million rows to 1 billion rows, from 10 million rows to 1 billion rows, from 25 million rows to 1 billion rows, from 50 million rows to 1 billion rows, from 100 million rows to 1 billion rows, from 250 million rows to 1 billion rows, or from 500 million rows to 1 billion rows.

In some embodiments, the table includes from 50 rows to 250 million rows, from 100 rows to 250 million rows, from 250 rows to 250 million rows, from 500 rows to 250 million rows, from 1000 rows to 250 million rows, from 2500 rows to 250 million rows, from 5000 rows to 250 million rows, from 10,000 rows to 250 million rows, from 25,000 rows to 250 million rows, from 50,000 rows to 250 million rows, from 100,000 rows to 250 million rows, from 250,000 rows to 250 million rows, from 500,000 rows to 250 million rows, from 1 million rows to 250 million rows, from 2.5 million rows to 250 million rows, from 5 million rows to 250 million rows, from 10 million rows to 250 million rows, from 25 million rows to 250 million rows, from 50 million rows to 250 million rows, or from 100 million rows to 250 million rows.

In some embodiments, the table includes from 50 rows to 50 million rows, from 100 rows to 50 million rows, from 250 rows to 50 million rows, from 500 rows to 50 million rows, from 1000 rows to 50 million rows, from 2500 rows to 50 million rows, from 5000 rows to 50 million rows, from 10,000 rows to 50 million rows, from 25,000 rows to 50 million rows, from 50,000 rows to 50 million rows, from 100,000 rows to 50 million rows, from 250,000 rows to 50 million rows, from 500,000 rows to 50 million rows, from 1 million rows to 50 million rows, from 2.5 million rows to 50 million rows, from 5 million rows to 50 million rows, from 10 million rows to 50 million rows, or from 25 million rows to 50 million rows.

In some embodiments, the table includes from 50 rows to 10 million rows, from 100 rows to 10 million rows, from 250 rows to 10 million rows, from 500 rows to 10 million rows, from 1000 rows to 10 million rows, from 2500 rows to 10 million rows, from 5000 rows to 10 million rows, from 10,000 rows to 10 million rows, from 25,000 rows to 10 million rows, from 50,000 rows to 10 million rows, from 100,000 rows to 10 million rows, from 250,000 rows to 10 million rows, from 500,000 rows to 10 million rows, from 1 million rows to 10 million rows, from 2.5 million rows to 10 million rows, or from 5 million rows to 10 million rows.

In some embodiments, the table includes from 50 rows to 2.5 million rows, from 100 rows to 2.5 million rows, from 250 rows to 2.5 million rows, from 500 rows to 2.5 million rows, from 1000 rows to 2.5 million rows, from 2500 rows to 2.5 million rows, from 5000 rows to 2.5 million rows, from 10,000 rows to 2.5 million rows, from 25,000 rows to 2.5 million rows, from 50,000 rows to 2.5 million rows, from 100,000 rows to 2.5 million rows, from 250,000 rows to 2.5 million rows, from 500,000 rows to 2.5 million rows, or from 1 million rows to 2.5 million rows.

In some embodiments, the table includes from 50 rows to 500,000 rows, from 100 rows to 500,000 rows, from 250 rows to 500,000 rows, from 500 rows to 500,000 rows, from 1000 rows to 500,000 rows, from 2500 rows to 500,000 rows, from 5000 rows to 500,000 rows, from 10,000 rows to 500,000 rows, from 25,000 rows to 500,000 rows, from 50,000 rows to 500,000 rows, from 100,000 rows to 500,000 rows, or from 250,000 rows to 500,000 rows.

Furthermore, in some embodiments, each medical record can include at least 10 respective attributes. Accordingly, in some embodiments, a metadata table includes at least 2 attributes per record, at least 3 attributes per record, at least 4 attributes per record, at least 5 attributes per record, at least 10 attributes per record, at least 15 attributes per record, at least 20 attributes per record, at least 25 attributes per record, or more.

Accordingly, 100 medical records translate into 4950 possible pairs (100C2) of medical records to make pairwise similarity comparisons. 1000 medical records translate into 499,500 possible pairs (1000C2) of medical records to make pairwise similarity comparisons. 10,000 medical records translate into 49,995,000 possible pairs (10,000C2) of medical records to make pairwise similarity comparisons. 100,000 medical records translate into 4,999,950,000 possible pairs (10,000C2) of medical records to make pairwise similarity comparisons. Therefore, it will be appreciated by one of ordinary skill in the art that the processes disclosed herein cannot be performed in the human mind.

Referring to block 216, in some embodiments, the pairwise similarity is an edit distance. An edit distance is a way of quantifying how similar or dissimilar two strings (e.g., text stings, words, alphameric text strings) are to one another, by measuring the minimum number of operations required to transform one string into the other.

Referring to block 218, in some embodiments, the edit distance is selected from the group consisting of a Levenshtein distance, a Jaro-Winkler distance, a Damerau-Levenshtein distance, a Jaccard distance, and a scaled or weighted version thereof.

Levenshtein distance is a string metric for measuring the difference between two sequences. The Levenshtein distance between two words is the minimum number of single-character edits (insertions, deletions or substitutions) required to change one word into the other. For a review of Levenshtein distance and algorithms for calculation see, for example, Hasan, Syeda Shabnam et al., *Approximate String Matching Algorithms: A Brief Survey and Comparison*, International Journal of Computer Applications, 120:26-31 (2015), which is incorporated herein by reference in its entirety.

As an example, the Levenshtein distance between a first string of text "Levenshtein" and a second string of text "Levenshten" is 1, because it takes one deletion of the single character "i" from the first string of text "Levenshtein," to change from the first string of text "Levenshtein" to the second string of text "Levenshten."

As another example, the Levenshtein distance between a third string of text "Levenshtein" and a fourth string of text "Levensthein" is 2:

1) Levenshtein→Levensttein (substitution of "h" in the third string of text "Levenshtein" with the letter "t" to form an intermediate string of text "Levensttein"), and
   2) Levensttein→Levensthein (substitution of "t" in the intermediate string of text "Levensttein" with the letter "h" to form the fourth string of text "Levensthein")

The Damerau-Levenshtein distance extends the Levenshtein distance method with an additional operation: transpose, where two adjacent characters can be swapped. For more information on Damerau-Levenshtein distance see, for example, Eric Brill and Robert C. Moore, *An improved error model for noisy channel spelling correction*, In Proceedings of the 38th Annual Meeting on Association for Computational Linguistics (ACL '00), Association for Computational Linguistics, USA, 286-293 (2000), which is incorporated by reference herein in its entirety.

Jaro-Winkler distance is a metric measuring an edit distance between two words. The Jaro distance is similar to Levenstein distance, but also accounts for transpositions between letters in the words. With the Winkler modification to the Jaro metric, the Jaro-Winkler distance also adds an increase in similarity for words which start with the same letters (prefix). For more information on Jaro-Winkler distance see, for example, Winkler, W., *String Comparator Metrics and Enhanced Decision Rules in the Fellegi-Sunter Model of Record Linkage*, Proceedings of the Section on Survey Research Methods (1990), which is incorporated by reference herein in its entirety. Jaro-Winkler similarity is a similarity algorithm indicating the percentage of matched characters between two character sequences and is equal to 1—Jaro-Winkler distance.

The Jaccard distance measures the dissimilarity between data sets and is obtained by subtracting the Jaccard similarity coefficient from 1. Murphy, A H, *The Finley Affair: A Signal Event in the History of Forecast Verification*, Weather and Forecasting, 11(1): 3-20 (1996), which is incorporated by reference herein in its entirety.

Referring to block 220, in some embodiments, the edit distance comprises a scaled Levenshtein distance. In some embodiments, the scaled Levenshtein distance is a modified metric that normalizes the Levenshtein distance so that it has values between 0 and 1. In some embodiments, the scaled Levenshtein distance between two text strings is defined as:

```
def scaled_levenshtein(str1, str2):
    max_distance = max(len(str1), len(str2))
    return 1 - (distance(str1, str2) / max_distance)
```

Referring again to the first example of the Levenshtein distance, whereby the Levenshtein distance between the first string of text "Levenshtein" and the second string of text "Levenshten" is 1, in this example, the maximum of the length of the first string of text and the second string of text (max(len(str1), len(str2)) is 11. Hence, the scaled Levenshtein distance in this case is: 1−(distance(str1, str2)/max_distance)=1−1/11=0.91.

Also, as noted in the second example of the Levenshtein distance, the Levenshtein distance between the third string of text "Levenshtein" and the fourth string of text "Levensthein" is 2. Here, max (len (str1), len (str2)=11. Hence, the scaled Levenshtein distance in this case is: 1−(distance(str1, str2)/max_distance)=1−2/11=0.82.

Referring again to FIG. 5A, in some embodiments, when the pairwise similarity is a scaled edit distance, a respective edge 416 represents a scaled_levenshtein (str1, str2) for all {str1, str2} in the attributes list.

Referring to block 222, in some embodiments, the set of one or more respective attributes consists of a single respective attribute. For example, in FIG. 4C, the set of one or more respective attributes consists of a single respective attribute 44-3 "ProtocolName". Similarly, referring to FIG. 4B, if the medical records are being categorized based on the contrast agent 44-4 used in the imaging methodology, the text strings 46-4 for each of files 1-5 are compared in a pairwise fashion to generate 10 similarity scores for the pairwise comparisons (e.g., 10 comparisons are made: 46-4-1 v 46-4-2, 46-4-1 v 46-4-3, . . . , 46-4-4 v 46-4-5).

In some embodiments, the set of one or more respective attributes is at least 2, at least 3, at least 4, at least 5, at least 6, at least 7, at least 8, at least 9, at least 10, or more respective attributes. In some embodiments, the set of one or more respective attributes is 2, 3, 4, 5, 6, 7, 8, 9, 10, or more respective attributes.

Referring to block 224 in FIG. 2, in some embodiments, the set of one or more respective attributes is at least two respective attributes and the pairwise similarity consists of a single similarity value.

In some embodiments, a single similarity value is determined by concatenating text strings for multiple respective attributes and then comparing the concatenated text strings. To illustrate, FIG. 4D shows an example for determining, based on the partial metadata table 404 in FIG. 4B, corresponding pairwise similarity for each respective pair of medical records 36, for two attributes 44-4 "ContrastAgent" and 44-5 "ReconstructionDiameter" 44-5. FIG. 4D shows that for a respective file (e.g., medical record), the string of text corresponding to the attribute 44-4 "ContrastAgent" and the string of text corresponding to the attribute 44-5 "ReconstructionDiameter" are concatenated into a single (i.e., one) string of text. To further elaborate, FIG. 4B shows that file 3 has a string of text 46-4-3 "CONTRAST" corresponding to the attribute 44-4 "ContrastAgent." FIG. 4B also shows that file 3 has a string of text 46-5-3 "452" corresponding to the attribute 44-5 "ReconstructionDiameter." FIG. 4D shows that file 3 has a string of text "CONTRAST452," which is a concatenation of (i) the string of text 46-4-3 and (ii) the string of text 46-5-3. In FIG. 4D, for each respective pair of medical records, the computer system 100 determines a respective pairwise similarity for each respective pair of medical records 36 by comparing their respective concatenated strings of text corresponding to the two attributes "ContrastAgent" and "ReconstructionDiameter," and generates (outputs) a single value for the corresponding pairwise similarity.

Referring to block 226, in some embodiments, the determining (step 210) comprises comparing (i) a first concatenated string of text including, for each respective attribute in the at least two respective attributes, the corresponding string of text for the first medical record in the respective pair of medical records and (ii) a second concatenated string of text including, for each respective attribute in the at least two respective attributes, the corresponding string of text for the second medical record in the respective pair of medical records.

For example, in some embodiments, the plurality of medical records includes medical records Record_1 and Record_2. The medical records include respective attributes attr_A and attr_B. Record_1 has corresponding attribute values attr_value_A1 and attr_value_B1 (e.g., strings of text) for the respective attributes attr_A and attr_B Record_2 has corresponding attribute values attr_value_A2 and attr_value_B2 for the respective attributes attr_A and attr_B. The similarity value is based on a comparison of (attr_value_A1. attr_value_B1) and (attr_value_A2. attr_value_B2).

In some embodiments, the method 200 includes concatenating n (attribute) values, corresponding to n respective attributes in the plurality of attributes, of the medical records, where n is a positive integer ranging from 2 to the total number of attributes. For example, as illustrated in FIG. 4D, the text string for two attributes can be concatenated for each respective medical record and an edit distance calculated between the two concatenated strings. In some embodiments, separate similarity values are calculated between respective attribute values for the respective medical evaluations and then combined, e.g., using a measure of central tendency or via aggregation (linear, graphical, etc.).

Referring to block 228, in some embodiments, the determining (step 210) comprises generating, for each respective attribute in the at least two respective attributes, a corresponding component similarity, thereby obtaining a plurality of component similarities for the respective pair of medical records and combining the plurality of component similarities to obtain a single similarity value for the respective pair of medical records. In some embodiments, the single similarity value is a measure of central tendency for the plurality of component similarities.

FIG. 4A shows that in some embodiments, the pairwise similarities are used to generate (408) a similarity graph. The similarity graph includes graph characteristics 410, including nodes 412 and edges 414. In some embodiments, the graph represents a level of similarity between two nodes through a corresponding edge length 416. In some embodiments, the similarity between nodes is scaled such that the edge length is inversely proportional to the similarity between the nodes. That is, in some embodiments, the greater the similarity between nodes, the shorter the length of the edge connecting the two nodes. For example, edge 414-5 is shorter than edge 414-6 (having an edge length 416-6), indicating that node 412-13 is more similar to node 412-1 than to node 412-16. In other embodiments, the edges lengths do not represent any information. That is, in some embodiments, all edges have the same length and simply represent that the nodes connected by an edge satisfy a similarity threshold.

In some embodiments, separate pairwise similarities are made for more than one respective attribute and the separate pairwise similarities are used to generate independent subgroupings of the medical data. For example, in some embodiments, at least two sets of pairwise comparisons are done based on different respective attributes (e.g., with reference to the table illustrated in FIG. 4B, a first set of pairwise comparison is made for the text strings of the ProtocolName field 44-3 and a second set of pairwise comparisons is made for the ContrastAgent field 44-4) and separate groupings are identified from each set of pairwise comparisons (e.g., returning to the table illustrated in FIG. 4B, a first set of data set groupings are identified from the comparisons of the ProtocolName field 44-3 and a second set of data set groupings are identified from the comparisons of the ContrastAgent field 44-4). In some such embodiments, a subset of data sets of interest are then identified from just one of the subgroupings (e.g., with reference to the table illustrated in FIG. 4B, from either the groupings identified from the comparisons of the ProtocolName field 44-3 or the groupings identified from the comparisons of the ContrastAgent field 44-4). In other such embodiments, a subset of data sets of interest are then identified using both subgroupings, e.g., all data sets that are present in a first subgroup of the first grouping and are also present in a second subgroup of the second grouping (e.g., with reference to the table illustrated in FIG. 4B, data sets are selected that are present in a subgrouping related to pancreatic masses with pelvis and are also present in a subgrouping related to an OMNI contrast agent).

In some embodiments, a first set of pairwise comparisons are made between text strings from a first attribute to identify a first set of groupings (e.g., with reference to the table illustrated in FIG. 4B, a first subgrouping is performed based on comparisons of the ProtocolName field 44-3) and then pairwise comparisons of only the members of an identified subgroup are made based on a second attribute text string (e.g., with reference to the table illustrated in FIG. 4B, data sets identified in a subgrouping related to pancreatic masses with pelvis are then compared to each other with respect to the text strings for the ContrastAgent field 44-4) to further refine the first subgroup or to generate new subsets of the subgroup.

Figure 5A:
FIG. 5A illustrates a similarity graph in accordance with some embodiments of the present disclosure.

Referring now to block 212 in FIG. 2, in some embodiments, the method 200 includes generating (e.g., via the graphing module 56) a first similarity graph that includes a plurality of nodes and a plurality of edges, where each respective node in the plurality of nodes corresponds to a respective medical record in the plurality of medical records, and each respective edge in the plurality of edges (i) connects a respective pair of nodes in the plurality of nodes and (ii) has a respective length based on the corresponding pairwise similarity for the respective pair of medical records corresponding to the pair of nodes. Examples of similarity graphs are illustrated in FIG. 4A and FIG. 5A.

Accordingly, in some embodiments, a similarity graph comprises at least 50 nodes, at least 100 nodes, at least 250 nodes, at least 500 nodes, at least 1000 nodes, at least 2500 nodes, at least 5000 nodes, at least 10,000 nodes, at least 25,000 nodes, at least 50,000 nodes, at least 100,000 nodes, at least 250,000 nodes, at least 500,000 nodes, at least 1 million nodes, at least 2.5 million nodes, at least 5 million nodes, at least 10 million nodes, at least 25 million nodes, at least 50 million nodes, at least 100 million nodes, at least 250 million nodes, at least 500 million nodes, or more nodes.

In some embodiments, the similarity graph includes no more than 1 billion nodes, no more than 500 million nodes, no more than 250 million nodes, no more than 100 million nodes, no more than 50 million nodes, no more than 25 million nodes, no more than 10 million nodes, no more than 2.5 million nodes, no more than 1 million nodes, no more than 500,000 nodes, no more than 250,000 nodes, no more than 100,000 nodes, no more than 50,000 nodes, no more than 25,000 nodes, no more than 10,000 nodes, or fewer nodes.

In some embodiments, the similarity graph includes from 50 nodes to 1 billion nodes, from 100 nodes to 1 billion nodes, from 250 nodes to 1 billion nodes, from 500 nodes to 1 billion nodes, from 1000 nodes to 1 billion nodes, from 2500 nodes to 1 billion nodes, from 5000 nodes to 1 billion nodes, from 10,000 nodes to 1 billion nodes, from 25,000 nodes to 1 billion nodes, from 50,000 nodes to 1 billion nodes, from 100,000 nodes to 1 billion nodes, from 250,000 nodes to 1 billion nodes, from 500,000 nodes to 1 billion nodes, from 1 million nodes to 1 billion nodes, from 2.5 million nodes to 1 billion nodes, from 5 million nodes to 1 billion nodes, from 10 million nodes to 1 billion nodes, from 25 million nodes to 1 billion nodes, from 50 million nodes to 1 billion nodes, from 100 million nodes to 1 billion nodes, from 250 million nodes to 1 billion nodes, or from 500 million nodes to 1 billion nodes.

In some embodiments, the similarity graph includes from 50 nodes to 250 million nodes, from 100 nodes to 250 million nodes, from 250 nodes to 250 million nodes, from 500 nodes to 250 million nodes, from 1000 nodes to 250 million nodes, from 2500 nodes to 250 million nodes, from 5000 nodes to 250 million nodes, from 10,000 nodes to 250 million nodes, from 25,000 nodes to 250 million nodes, from 50,000 nodes to 250 million nodes, from 100,000 nodes to 250 million nodes, from 250,000 nodes to 250 million nodes, from 500,000 nodes to 250 million nodes, from 1 million nodes to 250 million nodes, from 2.5 million nodes to 250 million nodes, from 5 million nodes to 250 million nodes, from 10 million nodes to 250 million nodes, from 25 million nodes to 250 million nodes, from 50 million nodes to 250 million nodes, or from 100 million nodes to 250 million nodes.

In some embodiments, the similarity graph includes from 50 nodes to 50 million nodes, from 100 nodes to 50 million nodes, from 250 nodes to 50 million nodes, from 500 nodes to 50 million nodes, from 1000 nodes to 50 million nodes, from 2500 nodes to 50 million nodes, from 5000 nodes to 50 million nodes, from 10,000 nodes to 50 million nodes, from 25,000 nodes to 50 million nodes, from 50,000 nodes to 50 million nodes, from 100,000 nodes to 50 million nodes, from 250,000 nodes to 50 million nodes, from 500,000 nodes to 50 million nodes, from 1 million nodes to 50 million nodes, from 2.5 million nodes to 50 million nodes, from 5 million nodes to 50 million nodes, from 10 million nodes to 50 million nodes, or from 25 million nodes to 50 million nodes.

In some embodiments, the similarity graph includes from 50 nodes to 10 million nodes, from 100 nodes to 10 million nodes, from 250 nodes to 10 million nodes, from 500 nodes to 10 million nodes, from 1000 nodes to 10 million nodes, from 2500 nodes to 10 million nodes, from 5000 nodes to 10 million nodes, from 10,000 nodes to 10 million nodes, from 25,000 nodes to 10 million nodes, from 50,000 nodes to 10 million nodes, from 100,000 nodes to 10 million nodes, from 250,000 nodes to 10 million nodes, from 500,000 nodes to 10 million nodes, from 1 million nodes to 10 million nodes, from 2.5 million nodes to 10 million nodes, or from 5 million nodes to 10 million nodes.

In some embodiments, the similarity graph includes from 50 nodes to 2.5 million nodes, from 100 nodes to 2.5 million nodes, from 250 nodes to 2.5 million nodes, from 500 nodes to 2.5 million nodes, from 1000 nodes to 2.5 million nodes, from 2500 nodes to 2.5 million nodes, from 5000 nodes to 2.5 million nodes, from 10,000 nodes to 2.5 million nodes, from 25,000 nodes to 2.5 million nodes, from 50,000 nodes to 2.5 million nodes, from 100,000 nodes to 2.5 million nodes, from 250,000 nodes to 2.5 million nodes, from 500,000 nodes to 2.5 million nodes, or from 1 million nodes to 2.5 million nodes.

In some embodiments, the similarity graph includes from 50 nodes to 500,000 nodes, from 100 nodes to 500,000 nodes, from 250 nodes to 500,000 nodes, from 500 nodes to 500,000 nodes, from 1000 nodes to 500,000 nodes, from 2500 nodes to 500,000 nodes, from 5000 nodes to 500,000 nodes, from 10,000 nodes to 500,000 nodes, from 25,000 nodes to 500,000 nodes, from 50,000 nodes to 500,000 nodes, from 100,000 nodes to 500,000 nodes, or from 250,000 nodes to 500,000 nodes.

FIG. 5A illustrates an example similarity graph 500 in accordance with some embodiments of the present disclosure. The similarity graph 500 is partially connected, because not all of the nodes are connected to each other node in the graph. The similarity graph 500 includes a plurality of nodes 412. In some embodiments, each respective node in the plurality of nodes 412 corresponds to a respective medical record in the plurality of medical records 36. In some embodiments, the first similarity graph is a partially connected graph that includes a plurality of edges 414. Each respective edge of the plurality of edges has a respective edge length that represents a pairwise similarity between pair of two nodes connected by the edge.

Referring to block 214, in some embodiments, the first similarity graph is generated by creating a respective node, in the plurality of nodes, for each respective medical record in the plurality of medical records and creating an edge, in the plurality of edges, between two respective nodes when the corresponding similarity between the pair of medical records corresponding to two respective nodes satisfies a first similarity threshold.

Figure 5B:
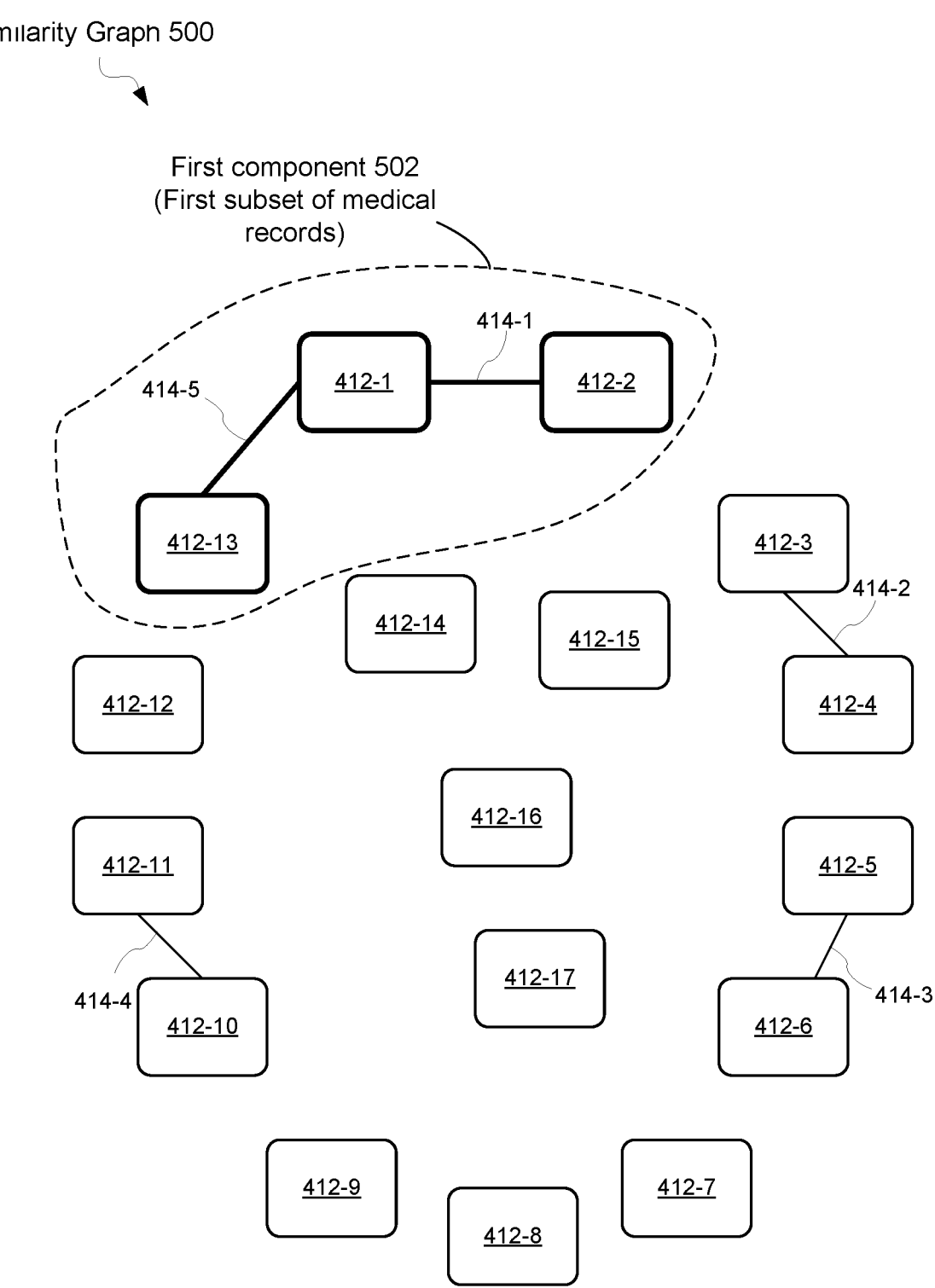
FIG. 5B illustrates a similarity graph that includes a first component, in accordance with some embodiments of the present disclosure.
Figure 5C:
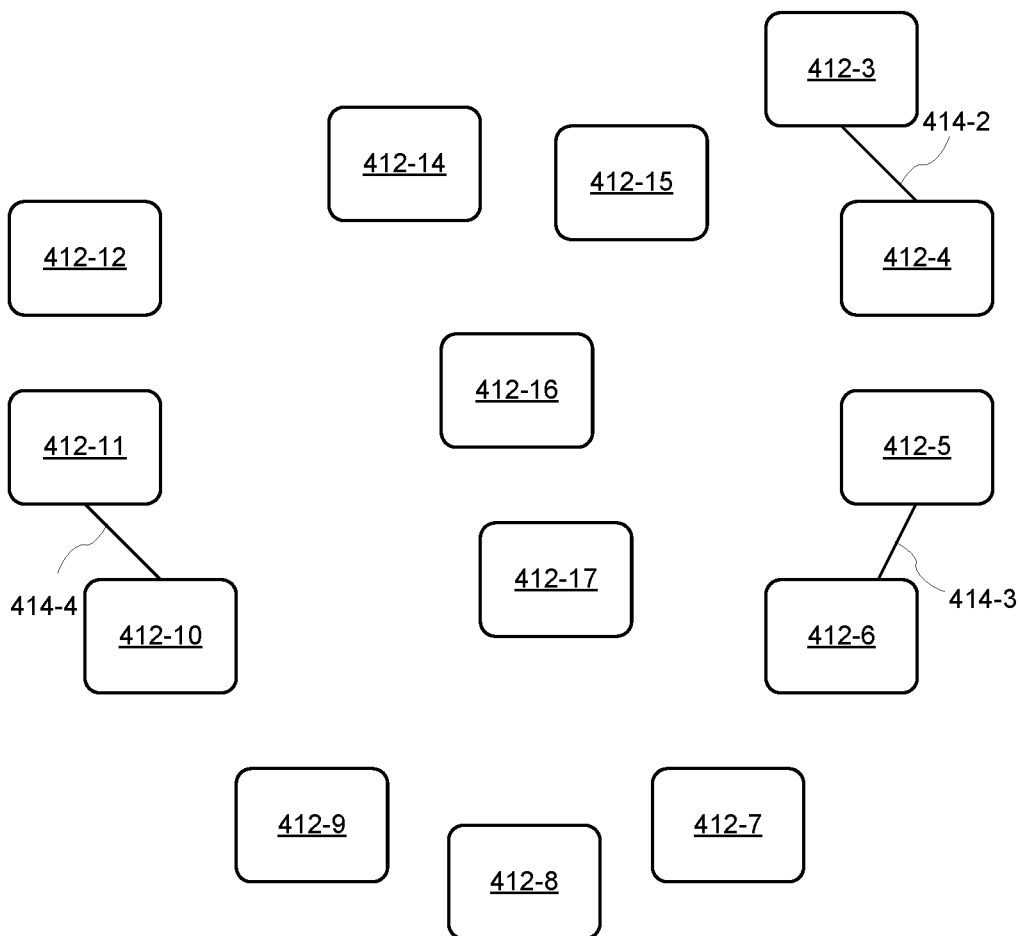
FIG. 5C illustrates a similarity graph that excludes a first component, in accordance with some embodiments of the present disclosure.
Figure 5D:
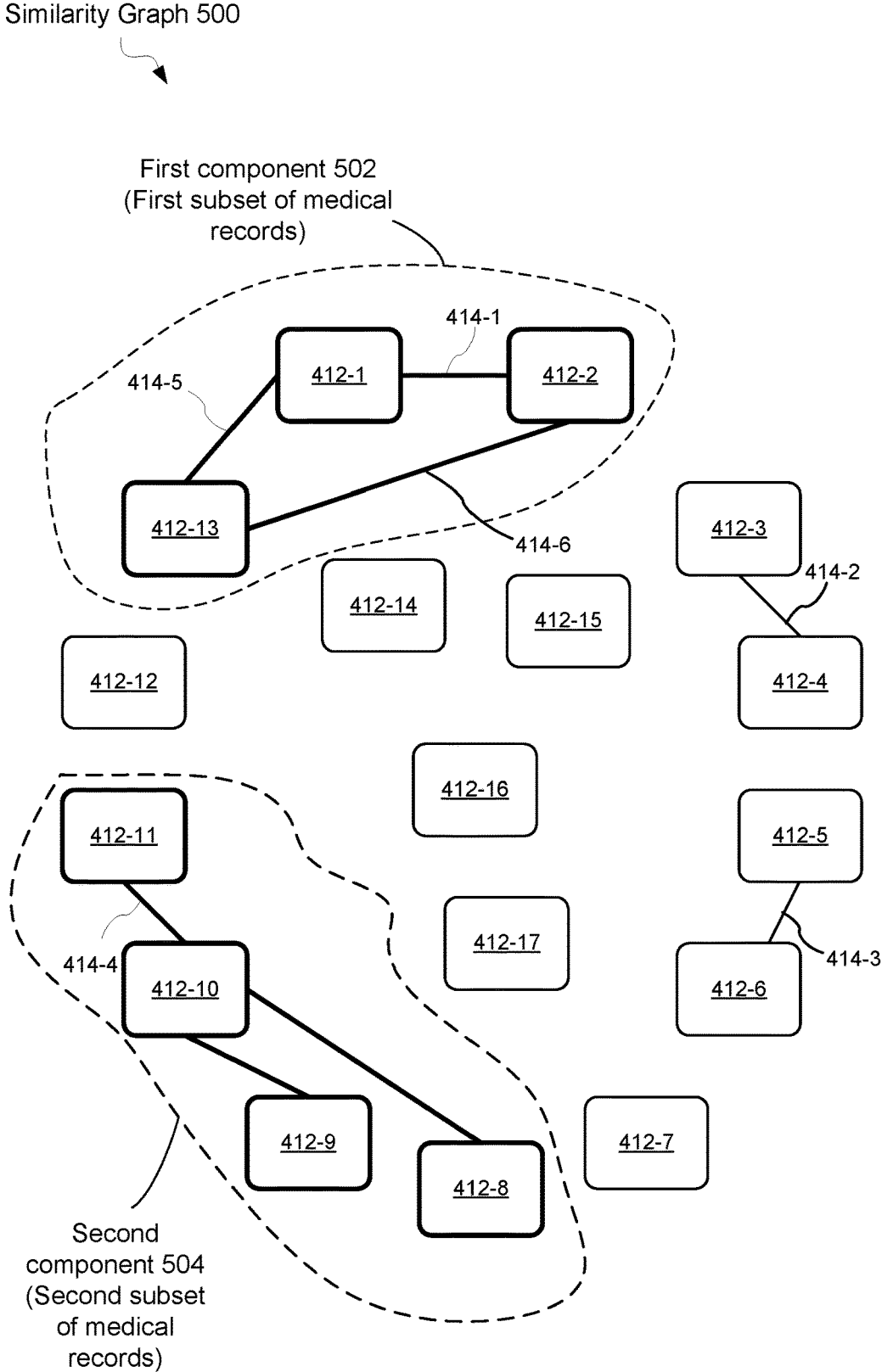
FIG. 5D illustrates a similarity graph that includes a first component and a second component, in accordance with some embodiments of the present disclosure.

Referring to block 230 in FIG. 2, the method 200 includes categorizing respective medical records (e.g., medical records 36) based on the plurality of pairwise similarities (e.g., edit distances 60 and/or pairwise similarities 432), thereby identifying a plurality of subsets of medical records in the plurality of medical records comprising a first subset of medical records and a second subset of medical records (e.g., first subset 502 and second subset 504 as illustrated in FIG. 5D). For each respective subset of medical records, each medical record in the respective subset is directly or indirectly connected to each other medical record in the respective subset through a subset of the plurality of pairwise similarities that each satisfy a first similarity threshold.

For example, as illustrated in FIG. 5D, each of nodes 412-8 through 412-11 representing medical records are members of the second subset because (1) each medical record has a pairwise similarity with another medical record in the second subset that satisfies a similarity threshold and (2) each medical record (represented by a node 412) is connected to each other medical record in the second subset by a chain of one or more pairwise similarities satisfying the similarity threshold. For example, the medical record represented by node 412-11 does not have a pairwise similarity with the medical record represented by node 412-8 that satisfies the similarity threshold. However, it is still a member of the second subset because it is indirectly connected. That is, the medical record represented by node 412-11 has a pairwise similarity with the medical record represented by node 412-10 that satisfies the similarity threshold, as indicated by the presence of an edge between the two nodes. and the medical record represented by node 412-10 has a pairwise similarity with the medical record represented by node 412-18 that satisfies the similarity threshold, as indicated by the presence of an edge between the nodes, such that node 412-11 is connected to node 412-8 through node 412-10.

Referring to block 231 in FIG. 2, in some embodiments, the method 200 includes identifying a first subset in the plurality of subsets of medical records, wherein each respective medical record in the first subset is directly or indirectly connected to each other respective medical record in the first subset through a set of pairwise similarities that each satisfy a first similarity threshold and identifying a second subset in the plurality of subsets of medical records wherein, (a) the second subset does not include any of the respective medical records in the first subset of the plurality of medical records and (b) each respective medical record in the second subset is directly or indirectly connected to each other respective medical record in the second subset through a respective set of pairwise similarities that each satisfy the first similarity threshold.

To illustrate, refer to the example of FIG. 4C. In this example, suppose that the first similarity threshold is 0.7 and medical record pairs whose pairwise similarities are at least 0.7 satisfy the similarity threshold. FIG. 4C shows that medical record pair (1,3) (consisting of medical record 1 and medical record 3), medical record pair (1,4), medical record pair (3,4), and medical record pair (4,5) each satisfies the first similarity threshold. Thus, in the example of FIG. 4C, the first subset of medical records consists of medical records 1, 3, 4, and 5. In this first subset, medical record 1 and medical record 3 are directly connected to each other because they have a respective pairwise similarity that satisfies the first similarity threshold of 0.7. By contrast, medical record 1 and medical record 5 are not directly connected to each other because they have a respective pairwise similarity of 0.2, which is less than the similarity threshold of 0.7. However, because medical record 1 and medical record 5 are each connected to medical record 4, and the pairwise similarity of the pair (1,4) and the pair (4,5) both satisfy the first similarity threshold, medical record 1 and medical record 1 are indirectly connected to each other via medical record 4.

Referring to block 232, in some embodiments, the identifying (step 230) comprises identifying a first component (e.g., a connected subgraph) of a similarity graph. For example, as illustrated in FIG. 5D, first component 502 identifies a first subset of medical records and second component 504 identifies a second subset of medical records. Algorithms for identifying components of a graph are known in the art. See, for example, Hopcroft and Tarjan, Algorithm 447: efficient algorithms for graph manipulation, Communications of the ACM, 16 (6): 372-78 (1973), which is incorporated herein by reference in its entirety.

Referring to block 234, in some embodiments, the first component of the first similarity graph is identified by: a) identifying a first edge, in the plurality of edges, connecting a first pair of nodes, in the plurality of nodes, that represents a greatest similarity between any pair of medical records in the plurality of medical records and adding the first pair of nodes to the first component; b) identifying each respective edge, in the plurality of edges, that (i) is directly connected to one of the first pair of nodes and (ii) has a corresponding length satisfying the first similarity threshold, thereby identifying a first subset of edges, and adding each respective node connected to respective edge in the first subset of edges to the first component; and c) repeating the identifying b) for each respective node added to the first component.

To illustrate, refer again to FIG. 5A. In this example, suppose that the edge 414-5 connecting the pair of nodes 412-13 and 412-1 represents the greatest similarity between any pair of medical records in the plurality of medical records. In this case, the computer system 100 adds the node 412-13 and adds the node 412-1 to the first component. Next, the computer system 100 identifies edge(s) that are directly connected to node 412-13 or directly connected to the node 412.1. The computer system 100 determines that edge 414-6, which connects node 412-13 and node 412-16, is directly connected to the node 412-13. The computer system 100 determines that edge 414-1, which connects node 412-1 to node 412-2, is directly connected to the node 412-1. The computer system 100 determines that the edge 414-6 does not have a corresponding length satisfying the first similarity threshold. The computer system 100 determines that the edge 414-1 has a corresponding length satisfying the first similarity threshold. The computer system 100 adds the node 412-2 connected to the edge 414-1 to the first component. The computer system repeats this process until each respective node is added to the first component. FIG. 5B illustrates the similarity graph 500 in which the first component 502 has been identified according to the steps outlined above, in accordance with some embodiments of the present disclosure.

Referring to block 236, in some embodiments, the method 200 includes identifying a second subset of the plurality of medical records by identifying a second component (e.g., a connected subgraph) of the first similarity graph.

In some embodiments, the second component of the first similarity graph comprises medical records that are not in the first component of the first similarity graph. To illustrate, FIG. 5C shows the similarity graph 500, excluding (minus) the first component 502. Suppose that in this example, the edge 414-4 connecting the pair of nodes 412-10 and 412-11 represents the greatest similarity between any pair of medical records in the remaining plurality of medical records. The computer system 100 adds the node 412-10 and the node 412-11 to the second component. The computer system 100 identifies each respective edge, in the plurality of edges, that is directly connected to either one of the node 412-10 or the node 412-11 and has a corresponding length satisfying the first similarity threshold. The computer system 100 adds each respective node connected to respective edge to the second component, and repeats the process until all nodes of the second component have been identified. FIG. 5D illustrates the similarity graph 500 including the first component 502 and the second component 504, in accordance with some embodiments of the present disclosure.

Referring to block 238, in some embodiments, the first similarity threshold consists of a single similarity threshold value.

Referring to block 240, in some embodiments, the set of one or more respective attributes is at least two respective attributes and the first similarity threshold comprises a corresponding similarity threshold value for each respective attribute in the at least two respective attributes.

Referring to block 241 in FIG. 2D2, the method 200 includes associating each respective subset of medical records in the plurality of subsets of medical records with a respective categorical label for the corresponding subset of medical records. In some embodiments, the most common text string for the respective attribute used to determine pairwise similarities within the subgroup is used as the respective categorical label. For example, in some embodiments, the system 100 determines the most common text string for in the subgroup for the one or more attributes used to determine the pairwise similarities and assigns the most common text string as a categorical label for the subgroup. In some embodiments, the determination ignores capitalization, e.g., "prostate cancer" and "Prostate Cancer" would each be counted as an occurrence of the same text string. In some embodiments, the determination accounts for spelling errors or alternative spellings, e.g., "prostate cancer" and "prostrate cancer" would each be counted as an occurrence of the same text string, as would "hemophilia" and "haemophilia." In some embodiments, a pre-curated/hard-coded list of string transforms could be applied to group members to help create a more uniform naming convention. Alternatively, in some embodiments, a random or iterative representative name can be applied to each group, e.g., if the focus was on creating machine learning/deep learning friendly data over human interpretable data.

Referring to block 243 in FIG. 2, in some embodiments, the method 200 includes obtaining, in electronic form, one or more additional medical records that were not in the plurality of medical records, wherein each respective additional medical record in the one or more additional medical records includes (i) corresponding medical data from a respective medical evaluation in one or more additional medical evaluations that were not in the plurality of medical evaluations, and (ii) corresponding metadata comprising, for each respective attribute in a plurality of attributes about the respective additional medical evaluation, a corresponding string of text.

In some embodiments, the method 200 also includes assigning, for each respective additional medical record in the one or more additional medical records, the respective additional medical record to either (i) a respective subset of medical records in the plurality of subsets of medical records or (ii) a new respective subset of medical records by comparing, for each respective attribute in the set of one or more respective attributes, (i) the corresponding string of text for the respective additional medical record to (ii) a corresponding string of text for each respective subset of medical records in the plurality of medical records to determine whether the respective additional medical record satisfies a corresponding criteria for inclusion in the respective subset of medical records.

Referring to block 242 in FIG. 2, in some embodiments, the method 200 includes identifying a second subset of the plurality of medical records where, (a) the second subset does not include any of the respective medical records in the first subset of the plurality of medical records and (b) each respective medical record in the second subset is directly or indirectly connected to each other respective medical record in the second subset through a respective set of pairwise similarities that each satisfy the first similarity threshold.

Referring to block 244, in some embodiments, the method 200 includes iteratively identifying additional subsets of the plurality of medical records where, (a) each additional subset does not include any of the respective medical records in any previously identified subset of the plurality of medical records and (b) each respective medical record in each respective additional subset is directly or indirectly connected to each other respective medical record in the respective additional subset through a respective set of pairwise similarities that each satisfy the first similarity threshold.

Referring to block 252 in FIG. 2, in some embodiments, the method 200 includes determining, for the first subset of the plurality of medical records, a corresponding measure of central tendency for the corresponding strings of text for the set of one or more respective attributes.

Referring to block 254, in some embodiments, the measure of central tendency for the first subset of the plurality of medical records is a centroid of the first component of the first similarity graph. For example, FIG. 5E shows the first similarity graph 500 including the first component 502 and a centroid 506 of the first component, in accordance with some embodiments of the present disclosure.

Referring to block 256 in FIG. 2, in some embodiments, the method 200 includes refining the first subset of the plurality of medical records by: determining, for each respective medical record, in a remainder subset of the plurality of medical records, a corresponding pairwise similarity between (i) for each respective attribute in the set of one or more respective attributes, the corresponding strings of text for the respective medical record and (ii) the corresponding measure of central tendency for the first subset of the plurality of medical records, where each respective medical record in the remainder subset is not a member of the first subset; and updating the first subset of the plurality of medical records to include respective medical records, in the remainder subset of the plurality of medical records, with a corresponding pairwise similarity that satisfies a second similarity threshold to generate a first updated subset of the plurality of medical records.

Figure 5E:
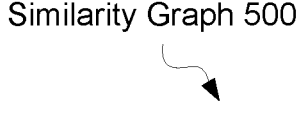
FIG. 5E shows a similarity graph that includes a first component and a centroid of the first component, in accordance with some embodiments of the present disclosure.
Figure 5F:
FIG. 5F illustrates a similarity graph that includes an updated first component 508, in accordance with some embodiments of the present disclosure.

With continued reference to FIG. 5E, and using the first connected graph 500 as an example, in some embodiments, the computer system 100 refines the first component 502 (the first subset of medical records) by determining, for a respective node 412 that does not belong to the first component 502, such as the nodes 412-14, 412-15, and 412-3 in FIG. 5A, a corresponding length of the respective edge 414 connecting the centroid 506 of the first component 502 to the respective node 412 (i.e., the lengths of edges 414-7, 414-8, and 414-9 in FIG. 5E). In some embodiments, when the respective edge 414 has a corresponding length that satisfies a second similarity threshold, the computer system 100 adds the node connected to the respective edge to the first component 502 to form an updated first component. FIG. 5F illustrates the first similarity graph 500 with an updated first component 508. In this example, the updated first component 508 includes the additional node 412-14 (in addition to the nodes 412-13, 412-1, and 412-2 that belong to the first component 502) because the edge 414-7 connecting the node 412-14 and the centroid 506 has a length that satisfies the second threshold.

Referring to block 258, in some embodiments, the remainder subset of the plurality of medical records comprises all medical records that are not part of the first subset of the plurality of medical records. For example, referring to FIG. 5D, in accordance with such an embodiment the remainder subset for first subset 502 would be all medical records associated with the nodes other than 412-1, 412-2, and 412-13.

Referring to block 260, in some embodiments, the remainder subset of the plurality of medical records comprises all medical records that are not part of any identified subset of the plurality of medical records. For example, referring to FIG. 5D, in accordance with such an embodiment the remainder subset for first subset 502 would be all medical records associated with the nodes other than 412-1, 412-2, 412-13 (as part of first subset 502), 412-8, 412-9, 412-10, and 412-11 (as part of second identified subset 504).

Referring to block 262, in some embodiments, the corresponding pairwise similarity for the respective medical record in the remainder subset of the plurality of medical records is determined using the same metric of similarity as for the corresponding pairwise similarity for the respective pair of medical records in the plurality of medical records Referring to block 264, in some embodiments, the second similarity threshold is the same as the first similarity threshold. In some embodiments, the second similarity threshold is different than the first similarity threshold.

Referring to block 266, in some embodiments, the corresponding pairwise similarity for the respective medical record in the remainder subset of the plurality of medical records and the measure of central tendency for the first subset of medical records is determined using a different metric of similarity than the metric of similarity used to determine the corresponding pairwise similarity for the respective pair of medical records in the plurality of medical records. In some embodiments, the corresponding pairwise similarity for the respective medical record in the remainder subset of the plurality of medical records and the measure of central tendency for the first subset of medical records is determined using the same metric of similarity as the metric of similarity used to determine the corresponding pairwise similarity for the respective pair of medical records in the plurality of medical records Referring to block 268 in FIG. 2, in some embodiments, the method 200 includes determining for the first updated subset of the plurality of medical records, a corresponding measure of central tendency for the corresponding strings of text for the set of one or more respective attributes.

Referring to block 270, in some embodiments, the method 200 includes repeating the refining (step 256) one or more times.

Referring to block 272 in FIG. 2, in some embodiments, the method 200 includes refining the first subset of the plurality of medical records by: determining, for each respective medical record, in the first subset of the plurality of medical records, a corresponding pairwise similarity between (i) for each respective attribute in the set of one or more respective attributes, the corresponding strings of text for the respective medical record and (ii) the corresponding measure of central tendency for the first subset of the plurality of medical records, where each respective medical record in the remainder subset is not a member of the first subset; and updating the first subset of the plurality of medical records to remove respective medical records, in the first subset of the plurality of medical records, with a corresponding pairwise similarity that does not satisfy a third similarity threshold to generate a second updated subset of the plurality of medical records.

Figure 5G:
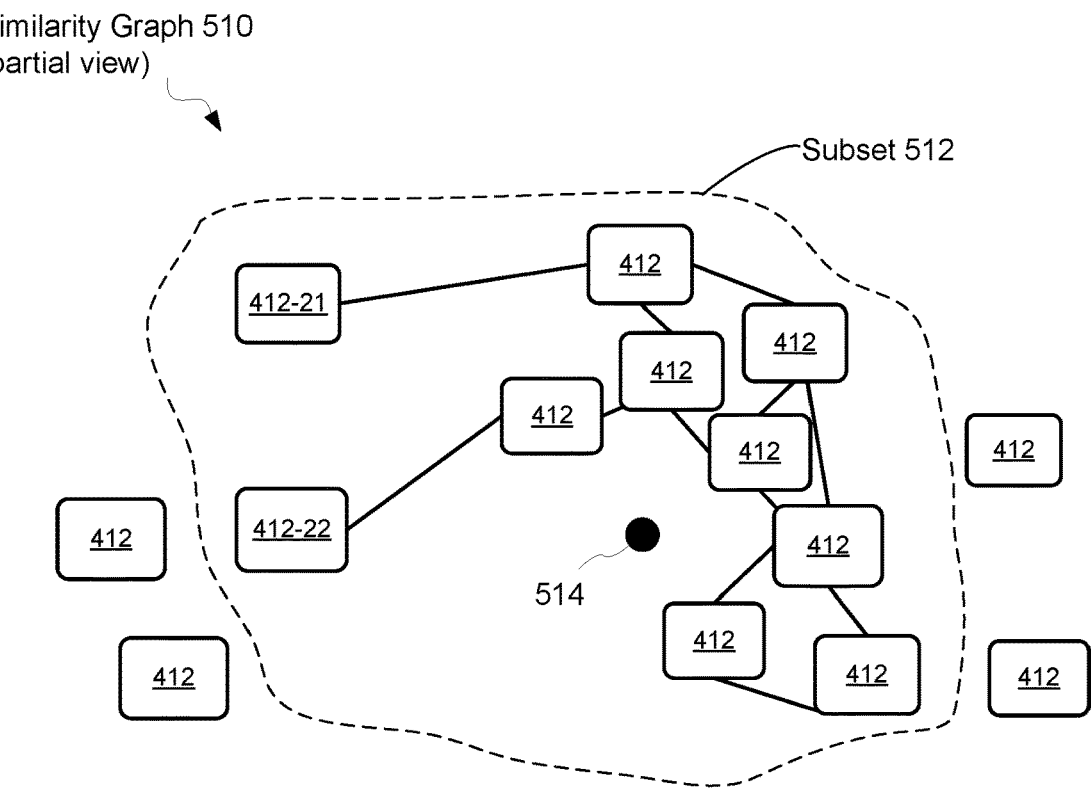
FIG. 5G illustrates a partial view of a similarity graph that includes an initial subset of medical records, in accordance with some embodiments of the present disclosure.
Figure 5H:
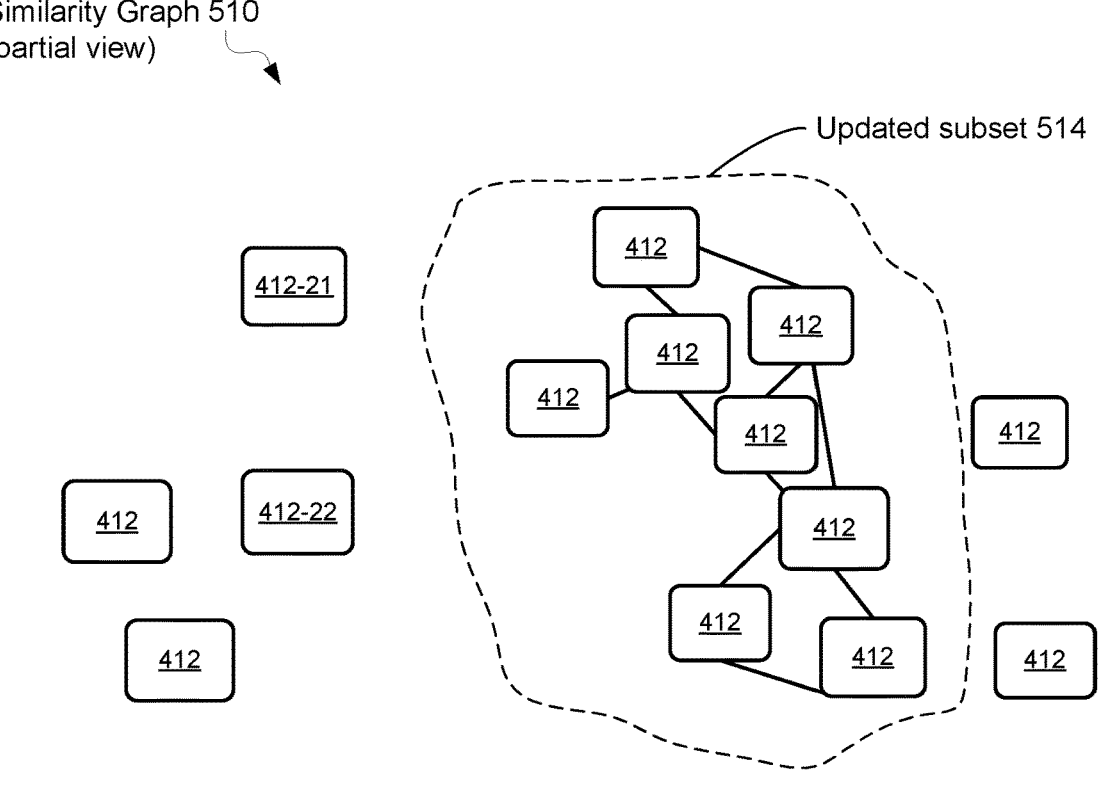
FIG. 5H illustrates a partial view of a similarity graph that includes an updated subset of medical records, generated by removing one more medical records from the initial subset, in accordance with some embodiments of the present disclosure.

To illustrate, FIG. 5G is a partial view of a similarity graph 510 in accordance with some embodiments. Each of the nodes 412 comprises a respective medical record. FIG. 5G shows an initial subset 512 of medical records that are formed by a subset of the nodes 412. The initial subset 512 of medical records has a centroid 514. In some embodiments, the computer system 100 refines the initial subset 512 by determining a respective pairwise similarity (e.g., edge length) between a respective node in the initial subset 512 and the centroid 514. In this example, the computer system 100 determines that the respective pairwise similarity between the node 412-21 and the centroid 514 does not satisfy the third similarity threshold. The computer system 100 determines that the respective pairwise similarity between the node 412-22 and the centroid 514 does not satisfy the third similarity threshold. In accordance with the determination, the computer system 100 generates an updated subset 514 of the plurality of medical records by removing the nodes 412-21 and 412-22 from the initial subset, as illustrated in FIG. 5H.

Referring to block 274, in some embodiments, the third similarity threshold is the same as the first similarity threshold. In some embodiments, the third similarity threshold is different than the first similarity threshold.

Referring to block 276, in some embodiments, the method 200 includes refining the second updated subset of the plurality of medical records by: determining, for each respective medical record, in a third subset of the plurality of medical records, a corresponding pairwise similarity between (i) for each respective attribute in the set of one or more respective attributes, the corresponding strings of text for the respective medical record and (ii) a corresponding measure of central tendency for the second updated subset of the plurality of medical records for the corresponding strings of text for the set of one or more respective attributes, where each respective medical record in the third subset is not a member of the second updated subset; and updating the second updated subset of the plurality of medical records to include respective medical records, in the third subset of the plurality of medical records, with a corresponding pairwise similarity that satisfies a fourth similarity threshold to generate a third updated subset of the plurality of medical records.

Referring to block 278, in some embodiments, the third subset of the plurality of medical records comprises all medical records that are not part of the second updated subset of the plurality of medical records.

Referring to block 280, in some embodiments, the third subset of the plurality of medical records comprises all medical records that are not part of any identified subset of the plurality of medical records.

Referring to block 282, in some embodiments, the method 200 includes determining for the first updated subset of the plurality of medical records, a corresponding measure of central tendency for the corresponding strings of text for the set of one or more respective attributes.

Referring to block 284, in some embodiments, the method 200 includes repeating the refining (step 272) one or more times. For example, in some embodiments, the threshold grouping criterion can be run by the algorithm (e.g., data categorization application 50) for a predefined number of times, or the algorithm may stop generating new groupings once the groups are well established (e.g., there is an updated subset of the plurality of medical records, and remaining medical records whose pairwise similarity values do not satisfy the criterion). At this point, the user renames the final groups based on what they see in the original metadata and the renamed metadata in each group as appropriate.

Referring to block 286 in FIG. 2, in some embodiments, the method generates a plurality of groupings for the plurality of medical evaluations, where each respective grouping in the plurality of groupings comprises a subset of the plurality of medical evaluations and where each respective medical evaluation in the plurality of medical evaluations is present in no more than one respective grouping in the plurality of groupings.

Referring to block 292 in FIG. 2, in some embodiments, the method 200 includes creating a grouping template 62 including a mapping of each respective medical record in the first subset of the plurality of medical records to a first group of medical records. This is illustrated in FIG. 4A at step 422 and in FIG. 4E.

For instance, FIG. 4E shows a grouping template that is created based on the corresponding pairwise similarity for respective pairs of medical records for the attribute 44-3 "ProtocolName." Referring to FIG. 4C, the pairs of medical records (1,3), (1,4), (3,4), and (4,5) each has a respective pairwise similarity that satisfies the similarity threshold for the attribute "ProtocolName." FIG. 4E shows that the subset of medical records (medical records 1, 3, 4, and 5) are mapped to a first group 434, and assigned (e.g., either automatically assigned by the computer device 100 or manually assigned) an output name "Pancreas."

Referring to block 294, in some embodiments, a second subset of the plurality of medical records has been identified and the grouping template comprises a mapping of each respective medical record in the second subset of the plurality of medical records to a second group of medical records.

Referring to block 298, in some embodiments, the method 200 includes automatically assigning a first name to the first group of medical records and a second name to the second group of medical records.

Referring to block 2100, in some embodiments, the method 200 includes manually assigning a first name to the first group of medical records and a second name to the second group of medical records. In some embodiments, the method also includes replacing (e.g., literal replacing, or adding an additional column in the data table, or a mask, or a filter) the corresponding set of one or more (attribute, metadata) strings of text for the set of one or more respective attributes according to a respective name assigned to a respective group in the first set of one or more groups, wherein the corresponding measure of central tendency is determined according to the respective name assigned to the corresponding group in the first set of one or more groups.

Referring to block 2102, in some embodiments, the method 200 includes generating, based on the plurality of medical records, a referential table including a plurality of rows and a plurality of columns, where each respective row in the plurality of rows corresponds to respective medical record in the plurality of medical records and each respective column in the plurality of columns corresponds to a respective attribute in the plurality of attributes.

Referring to block 2104, in some embodiments, the method further includes, for each respective medical record in the plurality of medical records: for a respective attribute in the set of one or more respective attributes, evaluating the corresponding string of text for the presence of a corresponding first substring of text representing a first type of information. The method further includes, when present in the corresponding string of text, excluding (e.g., masking) the corresponding first substring of text when determining a pairwise similarity during the determining.

In some embodiments, for a respective medical record in a respective pair of medical records in the plurality of records, the corresponding string of text for a respective attribute in the set of one or more respective attributes comprises a first substring of text representing a first type of information and a second substring of text representing a second type of information, and the method further comprises excluding the second substring of text from the corresponding string of text when determining a corresponding pairwise similarity between the respective medical record and another respective medical record, or between the respective medical record and a respective measure of central tendency for a subset of the plurality of medical records.

Medical files are often annotated by concatenating attributes about different types of information into a single text string stored in metadata, e.g., for efficiency. For example, medical imaging files are often annotated by a concatenation of an indication of the imaging modality used (e.g., MRI, CT scan, PET scan, X ray, etc.), a body part being imaged, and/or an orientation of an image acquisition (e.g., axial, coronal, sagittal, etc.). For instance, the text string "CT_CHEST_AXIAL" may be used to represent that the medical record is an image file for a CT scan of the chest of the subject performed in an axial orientation. Similarly, the annotation "CT_CHEST_CORONAL" may be used to represent that the medical record is again an image file for a CT scan of the chest of the subject but performed in a coronal orientation.

However, a practitioner may want to sort medical records using less than all the types of information concatenated into a single text string. For example, referring again to the example CT annotations above, it may be desirable to sort medical imaging files by the type of imaging modality and the body part being imaged, but not by the orientation of the imaging modality used. Under this set of circumstances, the medical records represented by the example text strings above should be grouped together, since they both relate to CT scans of a chest. However, when the full text strings are compared to determine a similarity between the medical files, e.g., by determining an editing distance between the text strings, their similarity will be low because the words "axial" and "coronal" are very different.

Accordingly, there is a need to account for concatenated information within a text string that is not relevant to a desired comparison between two medical records, e.g., imaging orientations in medical image files. In some embodiments, this is accomplished by evaluating text strings for expressions conveying such types of information and excluding any such expression from the comparison.

In some embodiments, the algorithm computes a corresponding pairwise similarity between a pair of text strings using a scaled phrase-invariant Levenshtein distance, where one or more identified phrases (expressions) are excluded from the similarity comparison. In some embodiments, the one or more identified phrases can be an orientation, an imaging modality, or a contrast phase. For example, in some embodiments, when evaluating a pairwise similarity between a first text string "CT_CHEST_AXIAL" and a second text string "CT_CHEST_CORONAL," the algorithm first masks the phrase (substring) "AXIAL" in the first text string and masks the phrase "CORONAL" in the second text string because each of these phrases represents an imaging orientation. The algorithm then computes the pairwise similarity for the masked first text string "CT_CHEST" and the masked second text string "CT_CHEST." In this example, the algorithm returns a scaled Levenshtein distance of 1.0.

Referring to block 2106, in some embodiments, the evaluating is natural language processing of the corresponding string of text.

In some embodiments, the text strings are evaluated using natural language processing (NLP), e.g., processing each string of text for the respective attribute across the data set. Natural language processing techniques are known in the art. For example, some embodiments use a synonym database or a thesaurus (e.g., WordNet) to generate synonyms for the strings of text for the respective attributes. A synonym database can output synonyms for an input string of text for the respective attributes. A natural language lexical database, such as a thesaurus, can be useful to generate an initial possible set of synonyms. Some lexical databases, such as WordNet (see wordnet.princeton.edu, which is incorporated by reference herein in its entirety), group strings of text based on their meanings and/or word senses, semantically disambiguating the strings of text, and sometimes labelling the semantic relations among different strings of text. Some embodiments use trained neutral network models to compute semantic and syntactic relatedness between strings of text for the respective attributes. For example, trained neural network models, such as Word2vec™ GloVe™, can be trained to learn associations between text strings using a large corpus of text. The trained models generate (output)

word embeddings word vectors) that similarity between the strings of text and enable efficient computation of semantic similarity using vector arithmetic.

Referring to block 2108, in some embodiments, the natural language processing comprises searching for one or more regular expressions in the corresponding string of text. In some embodiments, the one or more regular expressions are manually curated. In some embodiments, the one or more regular expressions include expressions identified by a machine learning model. In some embodiments, the one or more regular expressions include manually curated expressions and expressions identified by a machine learning model.

Referring to block 2110, in some embodiments, the first type of information is an orientation for a medical image. In some embodiments, the first type of information includes a word or phrase such as: AXIAL, CORONAL, SAGITAL, AX, COR, SAG, and/or equivalents thereof.

In some embodiments, orientation is filtered out of series description strings before running the graphing/grouping algorithm because every MRI patient will have three reconstructions (AXIAL, SAGITTAL, and CORONAL). The grouping algorithm may over focus on those easy to identify groups, and consistently produce 3 groups of series descriptions. The orientation substrings are filtered out before grouping to allow the grouping algorithm to focus on the rest of the series description.

Similarly, in some embodiments, if every patient's exam for a dataset consistently includes the same MRI sequences (for example T1-weighted and T2-weighted scans), those substrings may be filtered out to allow the grouping algorithm to focus on the rest of the string when creating groups. The post filtering string would be expected to be less uniform and thus to benefit from grouping more.

Referring to block 2112, in some embodiments, the first type of information is an MRI modality. In some embodiments, the first type of information includes a word or phrase such as: T1, T1post, T2, FLAIR, and/or equivalents thereof.

Referring to block 2114, in some embodiments, the first type of information is an imaging contrast phase. In some embodiments, the first type of information includes a word or phrase such as: no contrast, arterial, portal venous, and equivalents thereof.

Referring to block 2118, in some embodiments, the method 200 includes storing the plurality of medical evaluations in a plurality of folders 48 (directories) on the computer system, where a respective folder of the plurality of folders corresponds to a respective grouping of the plurality of groupings.

Referring to block 246, in some embodiments, the method 200 includes training a model using, for each respective medical record in the first subset of the plurality of medical records and each respective medical record in the second subset of the plurality of medical records, at least a portion of the corresponding medical data as independent variables for the training.

Referring to block 248, in some embodiments, the training comprises supervised training. The training further uses, (a) a first label for each respective medical record in the first subset of the plurality of medical records and (b) a second label that is different than the first label for each respective medical record in the second subset of the plurality of medical records, as dependent variables for the training.

Referring to block 250, in some embodiments, the training comprises unsupervised training.

Referring to block 288, in some embodiments, the method 200 includes determining, for each respective medical evaluation in one or more respective groupings in the plurality of groupings for the plurality of medical evaluations, a respective characteristic in a plurality of characteristics for the respective medical evaluation.

Referring to block 290, in some embodiments, the method 200 includes training a model using, for each respective medical evaluation in at least two respective groupings in the plurality of groupings. (i) the corresponding medical data as independent variables for the training and (ii) the respective characteristic as a dependent variable for the training.

Referring to block 296, in some embodiments, the method 200 includes assigning a first label for machine learning to each respective medical record in the first group of medical records and a second label for machine learning, that is different than the first label, to the second group of medical records.

In some embodiments, one or more subgroups of medical records are used to train a model. Non-limiting examples of models include a neural network, a support vector machine, a Naive Bayes model, a nearest neighbor model, a boosted trees model, a random forests model, and a clustering model. As used herein, the term "model" refers to a machine learning model or algorithm.

In some embodiments, a model is an unsupervised learning algorithm. One example of an unsupervised learning algorithm is cluster analysis.

In some embodiments, a model is supervised machine learning. Nonlimiting examples of supervised learning algorithms include, but are not limited to, logistic regression, neural networks, support vector machines, Naive Bayes algorithms, nearest neighbor algorithms, random forest algorithms, decision tree algorithms, boosted trees algorithms, multinomial logistic regression algorithms, linear models, linear regression, GradientBoosting, mixture models, hidden Markov models, Gaussian NB algorithms, linear discriminant analysis, or any combinations thereof. In some embodiments, a model is a multinomial classifier algorithm. In some embodiments, a model is a 2-stage stochastic gradient descent (SGD) model. In some embodiments, a model is a deep neural network (e.g., a deep-and-wide sample-level classifier).

In some embodiments, a model is utilized to normalize a value or data set, such as by transforming the value or a set of values to a common frame of reference for comparison purposes. For example, in some embodiments, when one or more pixel values corresponding to one or more pixels in a respective image is normalized to a predetermined statistic (e.g., a mean and/or standard deviation of one or more pixel values across one or more images), the pixel values of the respective pixels are compared to the respective statistic so that the amount by which the pixel values differ from the statistic is determined.

In some embodiments, an untrained model (e.g., "untrained classifier" and/or "untrained neural network") includes a machine learning model or algorithm, such as a classifier or a neural network, that has not been trained on a target dataset. In some embodiments, training a model (e.g., training a neural network) refers to the process of training an untrained or partially trained model (e.g., an untrained or partially trained neural network). For instance, consider the case of a plurality of training samples comprising a corresponding plurality of medical images (e.g., of a medical dataset). The plurality of medical images is applied as collective input to an untrained or partially trained model, in conjunction with a corresponding measured indication of one or more features for each respective medical image (hereinafter training dataset) to train the untrained or partially trained model on indications that identify features related to morphological classes, thereby obtaining a trained model. Moreover, it will be appreciated that the term "untrained model" does not exclude the possibility that transfer learning techniques are used in such training of the untrained or partially trained model. For instance, Fernandes et al., 2017, "Transfer Learning with Partial Observability Applied to Cervical Cancer Screening," Pattern Recognition and Image Analysis: 8th Iberian Conference Proceedings, 243-250, which is hereby incorporated by reference in its entirety for all purposes, provides non-limiting examples of such transfer learning. In instances where transfer learning is used, the untrained model described above is provided with additional data over and beyond that of the primary training dataset. That is, in non-limiting examples of transfer learning embodiments, the untrained model receives (i) the plurality of images and the measured indications for each respective image ("primary training dataset") and (ii) additional data. In some embodiments, this additional data is in the form of parameters (e.g., coefficients, weights, and/or hyperparameters) that were learned from another, auxiliary training dataset. Moreover, while a description of a single auxiliary training dataset has been disclosed, it will be appreciated that there is no limit on the number of auxiliary training datasets that may be used to complement the primary training dataset in training the untrained model in the present disclosure. For instance, in some embodiments, two or more auxiliary training datasets, three or more auxiliary training datasets, four or more auxiliary training datasets or five or more auxiliary training datasets are used to complement the primary training dataset through transfer learning, where each such auxiliary dataset is different than the primary training dataset. Any manner of transfer learning may be used in such embodiments. For instance, consider the case where there is a first auxiliary training dataset and a second auxiliary training dataset in addition to the primary training dataset. The parameters learned from the first auxiliary training dataset (by application of a first model to the first auxiliary training dataset) may be applied to the second auxiliary training dataset using transfer learning techniques (e.g., a second model that is the same or different from the first model), which in turn may result in a trained intermediate model whose parameters are then applied to the primary training dataset and this, in conjunction with the primary training dataset itself, is applied to the untrained model. Alternatively, a first set of parameters learned from the first auxiliary training dataset (by application of a first model to the first auxiliary training dataset) and a second set of parameters learned from the second auxiliary training dataset (by application of a second model that is the same or different from the first model to the second auxiliary training dataset) may each individually be applied to a separate instance of the primary training dataset (e.g., by separate independent matrix multiplications) and both such applications of the parameters to separate instances of the primary training dataset in conjunction with the primary training dataset itself (or some reduced form of the primary training dataset such as principal components or regression coefficients learned from the primary training set) may then be applied to the untrained model in order to train the untrained model. In some instances, additionally or alternatively, knowledge regarding objects related to morphological classes derived from an auxiliary training dataset is used, in conjunction with the object and/or class-labeled images in the primary training dataset, to train the untrained model.

Support vector machines. In some embodiments, the model is a support vector machine (SVM). SVM algorithms suitable for use as models are described in, for example, Cristianini and Shawe-Taylor, 2000, "An Introduction to Support Vector Machines," Cambridge University Press, Cambridge; Boser et al., 1992, "A training algorithm for optimal margin classifiers," in Proceedings of the 5th Annual ACM Workshop on Computational Learning Theory, ACM Press, Pittsburgh, Pa., pp. 142-152; Vapnik, 1998, Statistical Learning Theory, Wiley, New York; Mount, 2001, Bioinformatics: sequence and genome analysis, Cold Spring Harbor Laboratory Press, Cold Spring Harbor, N.Y.; Duda, Pattern Classification, Second Edition, 2001, John Wiley & Sons, Inc., pp. 259, 262-265; and Hastie, 2001, The Elements of Statistical Learning, Springer, New York; and Furcy et al., 2000, Bioinformatics 16, 906-914, each of which is hereby incorporated by reference in its entirety for all purposes. When used for classification, SVMs separate a given set of binary labeled data with a hyper-plane that is maximally distant from the labeled data. For cases in which no linear separation is possible, SVMs can work in combination with the technique of 'kernels', which automatically realizes a non-linear mapping to a feature space. The hyper-plane found by the SVM in feature space can correspond to a non-linear decision boundary in the input space. In some embodiments, the plurality of parameters (e.g., weights) associated with the SVM define the hyper-plane. In some embodiments, the hyper-plane is defined by at least 10, at least 20, at least 50, or at least 100 parameters and the SVM model requires a computer to calculate because it cannot be mentally solved.

Naïve Bayes algorithms. In some embodiments, the model is a Naive Bayes algorithm. Naïve Bayes classifiers suitable for use as models are disclosed, for example, in Ng et al., 2002, "On discriminative vs. generative classifiers: A comparison of logistic regression and naive Bayes," Advances in Neural Information Processing Systems, 14, which is hereby incorporated by reference in its entirety for all purposes. A Naive Bayes classifier is any classifier in a family of "probabilistic classifiers" based on applying Bayes' theorem with strong (naïve) independence assumptions between the features. In some embodiments, they are coupled with Kernel density estimation. See, for example, Hastie et al., 2001, *The elements of statistical learning: data mining, inference, and prediction*, eds. Tibshirani and Friedman, Springer, New York, which is hereby incorporated by reference in its entirety for all purposes.

Nearest neighbor algorithms. In some embodiments, a model is a nearest neighbor algorithm. Nearest neighbor models can be memory-based and include no model to be fit. For nearest neighbors, given a query point $x_0$ (a first image), the k training points $x_{(r)}$, r, . . . , k (here the training images) closest in distance to $x_0$ are identified and then the point $x_0$ is classified using the k nearest neighbors. In some embodiments, the distance to these neighbors is a function of the values of a discriminating set. In some embodiments, Euclidean distance in feature space is used to determine distance as $d_{(i)} = \|x_{(i)} - x_{(0)}\|$. In some embodiments, when the nearest neighbor algorithm is used, the value data used to compute the linear discriminant is standardized to have mean zero and variance 1. The nearest neighbor rule can be refined to address issues of unequal class priors, differential misclassification costs, and feature selection. Many of these refinements involve some form of weighted voting for the neighbors. For more information on nearest neighbor analysis, see Duda, *Pattern Classification*, Second Edition, 2001, John Wiley & Sons, Inc; and Hastic, 2001, The Elements of Statistical Learning, Springer, New York, each of which is hereby incorporated by reference in its entirety for all purposes.

A k-nearest neighbor model is a non-parametric machine learning method in which the input consists of the k closest training examples in feature space. The output is a class membership. An object is classified by a plurality vote of its neighbors, with the object being assigned to the class most common among its k nearest neighbors (k is a positive integer, typically small). If k=1, then the object is simply assigned to the class of that single nearest neighbor. See, Duda et al., 2001, *Pattern Classification*, Second Edition, John Wiley & Sons, which is hereby incorporated by reference in its entirety for all purposes. In some embodiments, the number of distance calculations needed to solve the k-nearest neighbor model is such that a computer is used to solve the model for a given input because it cannot be mentally performed.

Random forest, decision tree, and boosted tree algorithms. In some embodiments, the model is a decision tree. Decision trees suitable for use as models are described generally by Duda, 2001, Pattern Classification, John Wiley & Sons, Inc., New York, pp. 395-396, which is hereby incorporated by reference in its entirety for all purposes. Tree-based methods partition the feature space into a set of rectangles, and then fit a model (like a constant) in each one. In some embodiments, the decision tree is random forest regression. One specific algorithm that can be used is a classification and regression tree (CART). Other specific decision tree algorithms include, but are not limited to, ID3, C4.5, MART, and Random Forests. CART, ID3, and C4.5 are described in Duda, 2001, Pattern Classification, John Wiley & Sons, Inc., New York, pp. 396-408 and pp. 411-412, which is hereby incorporated by reference in its entirety for all purposes. CART, MART, and C4.5 are described in Hastie et al., 2001, The Elements of Statistical Learning, Springer-Verlag, New York, Chapter 9, which is hereby incorporated by reference in its entirety for all purposes. Random Forests are described in Breiman, 1999, "Random Forests—Random Features," Technical Report 567, Statistics Department, U.C. Berkeley, September 1999, which is hereby incorporated by reference in its entirety for all purposes. In some embodiments, the decision tree model includes at least 10, at least 20, at least 50, or at least 100 parameters (e.g., weights and/or decisions) and requires a computer to calculate because it cannot be mentally solved.

Linear discriminant analysis algorithms. Linear discriminant analysis (LDA), normal discriminant analysis (NDA), or discriminant function analysis can be a generalization of Fisher's linear discriminant, a method used in statistics, pattern recognition, and machine learning to find a linear combination of features that characterizes or separates two or more classes of objects or events. The resulting combination can be used as the model (e.g., a linear classifier) in some embodiments of the present disclosure.

Mixture model and Hidden Markov model. In some embodiments, the model is a mixture model, such as that described in McLachlan et al., Bioinformatics 18(3): 413-422, 2002. In some embodiments, in particular, those embodiments including a temporal component, the model is a hidden Markov model such as described by Schliep et al., 2003, Bioinformatics 19(1): 1255-i263.

Clustering. In some embodiments, the model is an unsupervised clustering model. In some embodiments, the model is a supervised clustering model. Clustering algorithms suitable for use as models are described, for example, at pages 211-256 of Duda and Hart, Pattern Classification and Scene Analysis, 1973, John Wiley & Sons, Inc., New York, (hereinafter "Duda 1973") which is hereby incorporated by reference in its entirety for all purposes. The clustering problem can be described as one of finding natural groupings in a dataset. To identify natural groupings, two issues can be addressed. First, a way to measure similarity (or dissimilarity) between two samples can be determined. This metric (e.g., similarity measure) can be used to ensure that the samples in one cluster are more like one another than they are to samples in other clusters. Second, a mechanism for partitioning the data into clusters using the similarity measure can be determined. One way to begin a clustering investigation can be to define a distance function and to compute the matrix of distances between all pairs of samples in a training dataset. If distance is a good measure of similarity, then the distance between reference entities in the same cluster can be significantly less than the distance between the reference entities in different clusters. However, clustering may not use a distance metric. For example, a nonmetric similarity function $s(x, x')$ can be used to compare two vectors $x$ and $x'$. $s(x, x')$ can be a symmetric function whose value is large when $x$ and $x'$ are somehow "similar." Once a method for measuring "similarity" or "dissimilarity" between points in a dataset has been selected, clustering can use a criterion function that measures the clustering quality of any partition of the data. Partitions of the data set that extremize the criterion function can be used to cluster the data. Particular exemplary clustering techniques that can be used in the present disclosure can include, but are not limited to, hierarchical clustering (agglomerative clustering using a nearest-neighbor algorithm, farthest-neighbor algorithm, the average linkage algorithm, the centroid algorithm, or the sum-of-squares algorithm), k-means clustering, fuzzy k-means clustering algorithm, and Jarvis-Patrick clustering. In some embodiments, the clustering includes unsupervised clustering (e.g., with no preconceived number of clusters and/or no predetermination of cluster assignments).

Ensembles of models and boosting. In some embodiments, an ensemble (two or more) of models is used. In some embodiments, a boosting technique such as AdaBoost is used in conjunction with many other types of learning algorithms to improve the performance of the model. In this approach, the output of any of the models disclosed herein, or their equivalents, is combined into a weighted sum that represents the final output of the boosted model. In some embodiments, the plurality of outputs from the models is combined using any measure of central tendency known in the art, including but not limited to a mean, median, mode, a weighted mean, weighted median, weighted mode, etc. In some embodiments, the plurality of outputs is combined using a voting method. In some embodiments, a respective model in the ensemble of models is weighted or unweighted.

The term "classification" can refer to any number(s) or other characters(s) that are associated with a particular property of a sample. For example, a "+" symbol (or the word "positive") can signify that a sample is classified as having a desired outcome or characteristic, whereas a "−" symbol (or the word "negative") can signify that a sample is classified as having an undesired outcome or characteristic. In another example, the term "classification" refers to a respective outcome or characteristic (e.g., high risk, medium risk, low risk). In some embodiments, the classification is binary (e.g., positive or negative) or has more levels of classification (e.g., a scale from 1 to 10 or 0 to 1). In some embodiments, the terms "cutoff" and "threshold" refer to predetermined numbers used in an operation. In one example, a cutoff value refers to a value above which results are excluded. In some embodiments, a threshold value is a value above or below which a particular classification applies. Either of these terms can be used in either of these contexts.

One of skill in the art will readily appreciate other models that are applicable to the systems and methods of the present disclosure. In some embodiments, the systems, methods, and devices of the present disclosure utilize more than one model to provide an evaluation (e.g., arrive at an evaluation given one or more inputs) with an increased accuracy. For instance, in some embodiments, each respective model arrives at a corresponding evaluation when provided a respective data set. Accordingly, each respective model can independently arrive at a result and then the result of each respective model is collectively verified through a comparison or amalgamation of the models. From this, a cumulative result is provided by the models. However, the present disclosure is not limited thereto.

FIGS. 6A, 6B, 6C, and 6D collectively provide a flowchart for an example method 600 categorizing medical data, in accordance with some embodiments. In some embodiments, the method 600 is performed at a computer system 100 that includes one or more processors (e.g., CPU 59) and memory (e.g., memory 90 or memory 92).

Referring to block 602 in FIG. 6A, in some embodiments, the method includes obtaining, in electronic form, a plurality of medical records, wherein each respective medical record in the plurality of medical records includes (i) corresponding medical data from a respective medical evaluation in a plurality of medical evaluations, and (ii) corresponding metadata comprising, for each respective attribute in a plurality of attributes about the respective medical evaluation, a corresponding string of text, wherein the plurality of medical records comprises 100 or more medical records.

Referring to block 604, in some embodiments, the method includes generating a first similarity graph by determining, for each respective pair of medical records in the plurality of medical records, a corresponding pairwise similarity between, for each respective attribute in a set of one or more respective attributes in the plurality of attributes, (i) the corresponding string of text for a first medical record in the respective pair of medical records and (ii) the corresponding string of text for a second medical record in the respective pair of medical records, the first similarity graph having a plurality of nodes and a plurality of edges, wherein: each respective node in the plurality of nodes corresponds to a respective medical record in the plurality of medical records, and each respective edge in the plurality of edges (i) connects a respective pair of nodes in the plurality of nodes and (ii) has a respective length based on the corresponding pairwise similarity for the respective pair of medical records corresponding to the pair of nodes. This is illustrated in FIG. 4A and FIG. 5A.

Referring to block 606, in some embodiments, the method includes identifying a first component of the first similarity graph, corresponding to a first subset of the plurality of medical records, by: a) identifying a first edge, in the plurality of edges, connecting a first pair of nodes, in the plurality of nodes, that represents a greatest similarity between any pair of medical records in the plurality of medical records and adding the first pair of nodes to the first component; b) identifying each respective edge, in the plurality of edges, that (i) is directly connected to one of the first pair of nodes and (ii) has a corresponding length satisfying the first similarity threshold, thereby identifying a first subset of edges, and adding each respective node connected to respective edge in the first subset of edges to the first component; and c) repeating the identifying b) for each respective node added to the first component. This is discussed with reference to FIG. 4A, FIG. 5A, and FIG. 5B.

Referring to block 608 in FIG. 6B, in some embodiments, the method includes identifying a second component of the first similarity graph, corresponding to a second subset of the plurality of medical records, where the second subset of the plurality of medical records excludes any of the respective medical records in the first subset of the plurality of medical records, by: a) identifying a second edge, in the plurality of edges, connecting a second pair of nodes, in the plurality of nodes excluding the respective nodes of the first component, that represents a greatest similarity between any pair of medical records in the plurality of medical records excluding the first subset of the plurality of medical records, and adding the second pair of nodes to the second component; b) identifying each respective edge, in the plurality of edges, that (i) is directly connected to one of the second pair of nodes and (ii) has a corresponding length satisfying the first similarity threshold, thereby identifying a second subset of edges, and adding each respective node connected to respective edge in the second subset of edges to the second component; and c) repeating the identifying b) for each respective node added to the second component. This is discussed with reference to FIG. 5C and FIG. 5D.

Referring to block 610, in some embodiments, the method includes iteratively identifying additional components of the first similarity graph wherein, (a) each additional component does not include any of the respective nodes in any previously identified components of the first similarity graph and (b) each respective node in each respective additional component is directly connected to a node of a respective pair of nodes in the each respective additional component and (ii) has a corresponding length satisfying the first similarity threshold Referring to block 612 in FIG. 6C, in some embodiments, the method includes determining a corresponding centroid for the first component of the first similarity graph. This is discussed with reference to FIG. 5E.

Referring to block 614, in some embodiments, the method includes refining the first component of the first similarity graph by: determining, for each respective node, in remainder nodes of the plurality of nodes, a corresponding pairwise similarity between (i) for each respective attribute in the set of one or more respective attributes, the corresponding strings of text (attribute values, metadata values) for the respective medical record and (ii) the corresponding measure of central tendency for the first component, wherein each respective node in the remainder nodes does not belong to the first component; and updating the first component to include respective nodes, in the remainder nodes, with a corresponding pairwise similarity that satisfies a second similarity threshold to generate a first updated component. This is discussed with reference to FIG. 5E.

Referring to block 616, in some embodiments, the method includes refining the first component by: determining, for each respective node, in the first component, a corresponding pairwise similarity between (i) for each respective attribute in the set of one or more respective attributes, the corresponding strings of text for the respective node and (ii) the corresponding centroid for the first component, wherein each respective node in the remainder nodes is not a member of the first component; and updating the first component to remove nodes, in the first component, with a corresponding pairwise similarity that does not satisfy a third similarity threshold to generate a second updated component. This is discussed with reference to FIG. 5G and FIG. 5H.

Figure 6D:
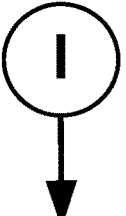

Referring to block 618 in FIG. 6D, in some embodiments, the method includes creating a grouping template, where the grouping template comprises a mapping of each respective medical evaluation that corresponds to a node in the first component to a first group of medical records. This is discussed with reference to FIG. 4A and FIG. 4E. The grouping template acts as a mapping of natural language strings with the same meaning. For example, the grouping template generated for a patient's study description would create a grouping of study IDs which all mention the volume being from an Axial view of the patient's chest. This then lets a user assign a uniform naming convention to map all strings within the group. This could be done manually or automatically, but the template aids dramatically in the process for large and diverse datasets.

Examples

As a proof of concept, the process described herein was used to quickly sort through 285 thousand imaging data sets to identify data sets of axial pre-treatment contrast enhanced CT imaging of lung cancer patients, excluding non-relevant image modalities, body parts, and contrast phases in a simple deterministic way. The selected image data sets were then used to train a machine learning algorithm for predicting the EGFR mutation status of lung cancer patients based on such CT images.

Briefly, metadata from approximately 285 thousand imaging data sets corresponding to different imaging modalities, different regions of interest, different image acquisition protocols, etc., was used to populate a metadata table. Fifty-four different categories of metadata were extracted from the medical imaging files, although not every image data set included a value for each category of metadata. Two pairwise comparisons between each data set were performed by determining an editing distance between the text strings for two metadata categories, study description and series description, from each data set. The 285 thousand data sets included 31 unique values for the series description metadata field and 573 unique values for the series description metadata field.

The pairwise comparisons were used to construct similarity graphs for each comparison, each similarity graph having a node representing each imaging data set and edges representing pairwise similarities meeting a threshold similarity. For the similarity graph generated based on study description, 4 component groupings were identified within the similarity graph. For the similarity graph generated based on series description, 41 component groupings were identified within the similarity graph. This represents more than a 10-fold consolidation of metadata groupings, as compared to grouping the datasets based on identical metadata field values. Grouping templates were generated for each component, to define subgroups of the imaging data sets which share common characteristics and low editing distances between the compared metadata fields.

The grouping template generated from the pairwise comparison of series description metadata was used to identify a subgroup of 128 axial pre-treatment contrast enhanced CT image sets of lung cancer patients for machine learning. The data sets were manually segmented by radiologists. 2079 radiomics features were then extracted from each image data set in the subgroup. The features were normalized, passed through a LASSO feature selection method, and then used to train a logistic regression binary classifier between patients with EGFR mutations and patients with wildtype EGFR genes. The model validated using five-fold cross validation, providing an roc AUC score of over 0.75.

Plural instances may be provided for components, operations or structures described herein as a single instance. Finally, boundaries between various components, operations, and data stores are somewhat arbitrary, and particular operations are illustrated in the context of specific illustrative configurations. Other forms of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first attribute could be termed a second attribute, and, similarly, a second attribute could be termed a first attribute, without changing the meaning of the description, so long as all occurrences of the "first attribute" are renamed consistently and all occurrences of the "second attribute" are renamed consistently. The first attribute, and the second attribute are both attributes, but they are not the same attribute.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for categorizing medical data, comprising:
at a computer system that includes one or more processors and memory:
A) obtaining, in electronic form, a plurality of medical records, wherein each respective medical record in the plurality of medical records includes (i) corresponding medical data from a respective medical evaluation in a plurality of medical evaluations, and (ii) corresponding metadata comprising, for each respective attribute in a corresponding plurality of attributes about the respective medical evaluation, a corresponding string of text, wherein the plurality of medical records comprises 100 or more medical records;
B) comparing metadata between respective medical records to determine, for each respective pair of medical records in the plurality of medical records, a corresponding pairwise similarity between, for each respective attribute in a set of one or more respective attributes, (i) the corresponding string of text for a first medical record in the respective pair of medical records and (ii) the corresponding string of text for a second medical record in the respective pair of medical records; and
C) categorizing respective medical records based on the plurality of pairwise similarities, thereby identifying a plurality of subsets of medical records in the plurality of medical records comprising a first subset of medical records and a second subset of medical records, wherein for each respective subset of medical records, each medical record in the respective subset is directly or indirectly connected to each other medical record in the respective subset through a subset of the plurality of pairwise similarities that each satisfy a first similarity threshold, wherein the categorizing comprises generating a first similarity graph that includes a plurality of nodes and a plurality of edges by:
creating a respective node, in the plurality of nodes, for each respective medical record in the plurality of medical records; and
creating an edge, in the plurality of edges, between two respective nodes when the corresponding similarity between the pair of medical records corresponding to two respective nodes satisfies the first similarity threshold,
wherein each respective node in the plurality of nodes corresponds to a respective medical record in the plurality of medical records, and each respective edge in the plurality of edges connects a respective pair of nodes in the plurality of nodes; and
C1) associating each respective subset of medical records in the plurality of subsets of medical records with a respective categorical label for the corresponding subset of medical records.

2. The method of claim 1, further comprising:
obtaining, in electronic form, one or more additional medical records that were not in the plurality of medical records, wherein each respective additional medical record in the one or more additional medical records includes (i) corresponding medical data from a respective medical evaluation in one or more additional medical evaluations that were not in the plurality of medical evaluations, and (ii) corresponding metadata comprising, for each respective attribute in a plurality of attributes about the respective additional medical evaluation, a corresponding string of text;
assigning, for each respective additional medical record in the one or more additional medical records, the respective additional medical record to either (i) a respective subset of medical records in the plurality of subsets of medical records or (ii) a new respective subset of medical records by comparing, for each respective attribute in the set of one or more respective attributes, (i) the corresponding string of text for the respective additional medical record to (ii) a corresponding string of text for each respective subset of medical records in the plurality of medical records to determine whether the respective additional medical record satisfies a corresponding criteria for inclusion in the respective subset of medical records.

3. The method of claim 1, wherein the associating comprises, for each respective subset of medical records, adding the respective categorical label to a corresponding electronic record for each respective medical record in the subset of medical records.

4. The method of claim 1, wherein the categorizing respective medical records (C) comprises:
identifying a first subset in the plurality of subsets of medical records, wherein each respective medical record in the first subset is directly or indirectly connected to each other respective medical record in the first subset through a set of pairwise similarities that each satisfy a first similarity threshold; and
identifying a second subset in the plurality of subsets of medical records wherein, (a) the second subset does not include any of the respective medical records in the first subset of the plurality of medical records and (b) each respective medical record in the second subset is directly or indirectly connected to each other respective medical record in the second subset through a respective set of pairwise similarities that each satisfy the first similarity threshold.

5. The method of claim 4 wherein
the method generates a plurality of groupings for the plurality of medical evaluations, wherein each respective grouping in the plurality of groupings comprises a subset of the plurality of medical evaluations and where each respective medical evaluation in the plurality of medical evaluations is present in no more than one respective grouping in the plurality of groupings; and
the method further comprises:
determining, for each respective medical evaluation in one or more respective groupings in the plurality of groupings for the plurality of medical evaluations, a respective characteristic in a plurality of characteristics for the respective medical evaluation, and
training a model using, for each respective medical evaluation in at least two respective groupings in the plurality of groupings, (i) the corresponding medical data as independent variables for the training and (ii) the respective characteristic as a dependent variable for the training.

6. The method of claim 1, further comprising:

D) determining, for the first subset of the plurality of medical records, a corresponding measure of central tendency for the corresponding strings of text for the set of one or more respective attributes; and E) refining the first subset of the plurality of medical records by:

determining, for each respective medical record, in a remainder subset of the plurality of medical records, a corresponding pairwise similarity between (i) for each respective attribute in the set of one or more respective attributes, the corresponding strings of text for the respective medical record and (ii) the corresponding measure of central tendency for the first subset of the plurality of medical records, wherein each respective medical record in the remainder subset is not a member of the first subset; and updating the first subset of the plurality of medical records to include respective medical records, in the remainder subset of the plurality of medical records, with a corresponding pairwise similarity that satisfies a second similarity threshold to generate a first updated subset of the plurality of medical records.

7. The method of claim 6, wherein the remainder subset of the plurality of medical records comprises all medical records that are not part of the first subset of the plurality of medical records.

8. The method of claim 6, further comprising:

F) refining the first subset of the plurality of medical records by:

determining, for each respective medical record, in the first subset of the plurality of medical records, a corresponding pairwise similarity between (i) for each respective attribute in the set of one or more respective attributes, the corresponding strings of text for the respective medical record and (ii) the corresponding measure of central tendency for the first subset of the plurality of medical records, wherein each respective medical record in the remainder subset is not a member of the first subset; and updating the first subset of the plurality of medical records to remove respective medical records, in the first subset of the plurality of medical records, with a corresponding pairwise similarity that does not satisfy a third similarity threshold to generate a second updated subset of the plurality of medical records.

9. The method of claim 1, further comprising identifying a first component of the first similarity graph.

10. The method of claim 9, wherein each respective edge in the plurality of edges has a respective length based on the corresponding pairwise similarity for the respective pair of medical records corresponding to the pair of nodes and the first component of the first similarity graph is identified by:

a) identifying a first edge, in the plurality of edges, connecting a first pair of nodes, in the plurality of nodes, that represents a greatest similarity between any pair of medical records in the plurality of medical records and adding the first pair of nodes to the first component;

b) identifying each respective edge, in the plurality of edges, that (i) is directly connected to one of the first pair of nodes and (ii) has a corresponding length satisfying the first similarity threshold, thereby identifying a first subset of edges, and adding each respective node connected to respective edge in the first subset of edges to the first component; and c) repeating the identifying b) for each respective node added to the first component.

11. The method of claim 1, further comprising creating a grouping template comprising a mapping of each respective medical record in the first subset of the plurality of medical records to a first group of medical records.

12. The method of claim 1, further comprising generating, based on the plurality of medical records, a referential table comprising a plurality of rows and a plurality of columns, wherein each respective row in the plurality of rows corresponds to respective medical record in the plurality of medical records and each respective column in the plurality of columns corresponds to a respective attribute in the plurality of attributes.

13. The method of claim 1, wherein the pairwise similarity is an edit distance.

14. The method of claim 1, wherein the method further comprises, for each respective medical record in the plurality of medical records:

for a respective attribute in the set of one or more respective attributes, evaluating the corresponding string of text for the presence of a corresponding first substring of text representing a first type of information by natural language processing of the corresponding string of text; and when present in the corresponding string of text, excluding the corresponding first substring of text when determining a pairwise similarity during the determining B).

15. The method of claim 14, where the natural language processing comprises searching for one or more regular expressions in the corresponding string of text.

16. The method of claim 1, further comprising storing the plurality of medical evaluations in a plurality of folders on the computer system, wherein a respective folder of the plurality of folders corresponds to a respective grouping of the plurality of groupings.

17. A computer system, comprising:

one or more processors; and a non-transitory computer-readable medium including computer-executable instructions that, when executed by the one or more processors, cause the processors to perform a method comprising:

A) obtaining, in electronic form, a plurality of medical records, wherein each respective medical record in the plurality of medical records includes (i) corresponding medical data from a respective medical evaluation in a plurality of medical evaluations, and (ii) corresponding metadata comprising, for each respective attribute in a corresponding plurality of attributes about the respective medical evaluation, a corresponding string of text, wherein the plurality of medical records comprises 100 or more medical records;

B) comparing metadata between respective medical records to determine, for each respective pair of medical records in the plurality of medical records, a corresponding pairwise similarity between, for each respective attribute in a set of one or more respective attributes, (i) the corresponding string of text for a first medical record in the respective pair of medical records and (ii) the corresponding string of text for a second medical record in the respective pair of medical records; and C) categorizing respective medical records based on the plurality of pairwise similarities, thereby identifying a plurality of subsets of medical records in the plurality of medical records comprising a first subset of medical records and a second subset of medical records, wherein for each respective subset of medical records, each medical record in the respective subset is directly or indirectly connected to each other medical record in the respective subset through a subset of the plurality of pairwise similarities that each satisfy a first similarity threshold, wherein the categorizing comprises generating a first similarity graph that includes a plurality of nodes and a plurality of edges by:

creating a respective node, in the plurality of nodes, for each respective medical record in the plurality of medical records; and creating an edge, in the plurality of edges, between two respective nodes when the corresponding similarity between the pair of medical records corresponding to two respective nodes satisfies the first similarity threshold;

wherein each respective node in the plurality of nodes corresponds to a respective medical record in the plurality of medical records, and each respective edge in the plurality of edges connects a respective pair of nodes in the plurality of nodes; and C1) associating each respective subset of medical records in the plurality of subsets of medical records with a respective categorical label for the corresponding subset of medical records.

18. A non-transitory computer-readable storage medium having stored thereon program code instructions that, when executed by a processor, cause the processor to perform a method comprising:

A) obtaining, in electronic form, a plurality of medical records, wherein each respective medical record in the plurality of medical records includes (i) corresponding medical data from a respective medical evaluation in a plurality of medical evaluations, and (ii) corresponding metadata comprising, for each respective attribute in a corresponding plurality of attributes about the respective medical evaluation, a corresponding string of text, wherein the plurality of medical records comprises 100 or more medical records;

B) comparing metadata between respective medical records to determine, for each respective pair of medical records in the plurality of medical records, a corresponding pairwise similarity between, for each respective attribute in a set of one or more respective attributes, (i) the corresponding string of text for a first medical record in the respective pair of medical records and (ii) the corresponding string of text for a second medical record in the respective pair of medical records; and C) categorizing respective medical records based on the plurality of pairwise similarities, thereby identifying a plurality of subsets of medical records in the plurality of medical records comprising a first subset of medical records and a second subset of medical records, wherein for each respective subset of medical records, each medical record in the respective subset is directly or indirectly connected to each other medical record in the respective subset through a subset of the plurality of pairwise similarities that each satisfy a first similarity threshold, wherein the categorizing comprises generating a first similarity graph that includes a plurality of nodes and a plurality of edges by:

creating a respective node, in the plurality of nodes, for each respective medical record in the plurality of medical records; and creating an edge, in the plurality of edges, between two respective nodes when the corresponding similarity between the pair of medical records corresponding to two respective nodes satisfies the first similarity threshold;

wherein each respective node in the plurality of nodes corresponds to a respective medical record in the plurality of medical records, and each respective edge in the plurality of edges connects a respective pair of nodes in the plurality of nodes; and C1) associating each respective subset of medical records in the plurality of subsets of medical records with a respective categorical label for the corresponding subset of medical records.

* * * * *